(12) United States Patent
Kim et al.

(10) Patent No.: US 11,843,913 B2
(45) Date of Patent: *Dec. 12, 2023

(54) DISPLAY APPARATUS

(71) Applicant: LG Display Co., Ltd., Seoul (KR)

(72) Inventors: Chiwan Kim, Paju-si (KR); Kyungyeol Ryu, Paju-si (KR); YuSeon Kho, Paju-si (KR); YongGyoon Jang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 147 days.

This patent is subject to a terminal disclaimer.

(21) Appl. No.: 17/346,043

(22) Filed: Jun. 11, 2021

(65) Prior Publication Data

US 2021/0306758 A1    Sep. 30, 2021

Related U.S. Application Data

(63) Continuation of application No. 16/431,737, filed on Jun. 5, 2019, now Pat. No. 11,064,300.

(30) Foreign Application Priority Data

Mar. 29, 2019  (KR) .......................... 10-2019-0037508

(51) Int. Cl.
*H04R 17/00*  (2006.01)
*H04R 1/02*  (2006.01)
(Continued)

(52) U.S. Cl.
CPC ............... *H04R 17/00* (2013.01); *G06F 3/16* (2013.01); *H04R 1/028* (2013.01); *G06F 1/1601* (2013.01);
(Continued)

(58) Field of Classification Search
CPC .... H04R 17/00; H04R 1/028; H04R 2440/05; H04R 2499/15; H04R 7/045; G06F 3/16; G09G 2380/02; G09G 3/2092
(Continued)

(56) References Cited

U.S. PATENT DOCUMENTS 6,629,341 B2    10/2003  Wilkie et al.
6,831,393 B2 *  12/2004  Miyazawa ............. H02N 2/026
                                                    310/323.14
(Continued)

FOREIGN PATENT DOCUMENTS

CN    102103317 A    6/2011
CN    102725873 A    10/2012
(Continued)

OTHER PUBLICATIONS

Office Action dated Sep. 1, 2021, issued in corresponding Chinese Patent Application No. 201910495616.3.
U.S. Appl. No. 16/385,821, filed Apr. 16, 2019.

*Primary Examiner* — Lun-See Lao
(74) *Attorney, Agent, or Firm* — Morgan, Lewis & Bockius LLP

(57) ABSTRACT

A display apparatus includes: a display panel configured to be rolled or unrolled, at least one vibration module on a rear surface of the display panel, the at least one vibration module being configured to: be rolled or unrolled with the display panel, and vibrate the display panel, and a partition on the rear surface of the display panel, the partition being spaced apart from and surrounding the at least one vibration module, wherein the at least one vibration module includes: a plurality of first portions having a piezoelectric property, and a plurality of second portions between the plurality of first portions, the plurality of second portions having flexibility.

41 Claims, 11 Drawing Sheets

(51) Int. Cl.
*G06F 3/16* (2006.01)
*G06F 1/16* (2006.01)
*G09G 3/20* (2006.01)

(52) U.S. Cl.
CPC ....... *G09G 3/2092* (2013.01); *G09G 2380/02* (2013.01); *H04R 2499/15* (2013.01)

(58) Field of Classification Search
USPC .............................................. 381/333, 56–58
See application file for complete search history.

(56) References Cited

U.S. PATENT DOCUMENTS

| | | | |
|---|---|---|---|
| 7,197,798 | B2 | 4/2007 | Wilkie et al. |
| 8,712,079 | B2 | 4/2014 | Kim et al. |
| 8,873,776 | B2 | 10/2014 | Kim et al. |
| 9,712,777 | B2 | 7/2017 | Yeo et al. |
| 10,782,740 | B2 | 9/2020 | Kim et al. |
| 11,064,300 | B2 * | 7/2021 | Kim ...................... H04R 7/045 |
| 2003/0056351 | A1 | 3/2003 | Wilkie et al. |
| 2005/0105748 | A1 | 5/2005 | Bartell |
| 2008/0285778 | A1 * | 11/2008 | Kuroda ................ G03B 21/565 381/152 |
| 2011/0132557 | A1 | 6/2011 | Kuroi et al. |
| 2012/0148073 | A1 | 6/2012 | Kim et al. |
| 2012/0274178 | A1 | 11/2012 | Ochi et al. |
| 2017/0161868 | A1 * | 6/2017 | Kim ........................ G09F 9/301 |
| 2017/0344073 | A1 | 11/2017 | Kang et al. |
| 2019/0037164 | A1 | 1/2019 | Kim et al. |
| 2019/0087630 | A1 | 3/2019 | Seo et al. |

FOREIGN PATENT DOCUMENTS

| | | |
|---|---|---|
| CN | 107452282 A | 12/2017 |
| CN | 108124224 A | 6/2018 |
| CN | 109326236 A | 2/2019 |
| CN | 109509773 A | 3/2019 |
| JP | 2015-025909 A | 2/2015 |
| KR | 10-2010-0073075 A | 7/2010 |
| KR | 10-2016-0015348 A | 2/2016 |

* cited by examiner

DISPLAY APPARATUS

CROSS-REFERENCE TO RELATED APPLICATION(S)

This application is a continuation of U.S. patent application Ser. No. 16/431,737, filed on Jun. 5, 2019, which claims the benefit of and priority to Korean Patent Application No. 10-2019-0037508, filed on Mar. 29, 2019, the entirety of each of which is hereby incorporated by reference.

BACKGROUND

1. Technical Field

The present disclosure relates to a display apparatus.

2. Discussion of the Related Art

Recently, with the advancement of the information age, a display field for visually displaying an electric information signal has been rapidly developed. In response to this trend, various display apparatuses having excellent properties of a thin profile, light weight, and low power consumption have been developed.

Among the display apparatuses, because an organic light-emitting display apparatus, a liquid crystal display apparatus, and an electrophoresis display apparatus may have a thin profile, studies and developments for implementing these apparatuses as flexible display apparatuses are in progress. For example, studies and developments of a rollable display apparatus, capable of rolling a flexible display panel like a roll or scroll, have been actively made.

Because a sound output from a sound system of the rollable display apparatus travels toward a rear direction or a downward direction of a housing module, sound quality may be deteriorated due to interference between sounds reflected from a wall or the ground, whereby problems occur in that it is difficult to perform an exact sound transfer and an immersion experience of a viewer is deteriorated. For example, the sound system may be an actuator that includes a magnet and a coil. However, if the sound system that includes an actuator is applied to a display apparatus, a problem occurs in that the display apparatus becomes thick. In this respect, a piezoelectric element capable of implementing a thin thickness has been spotlighted.

The piezoelectric element is likely to be damaged by external impact due to its brittleness property, whereby a problem occurs in that reliability in sound reproduction is low. A sound system applied to a display apparatus may be implemented as a film-type vibration module. Because the film-type vibration module may be manufactured with a large area, the film-type vibration module may be applied to a large scaled display apparatus. However, a problem occurs in that it is difficult for the film-type vibration module to have a large area due to low vibration caused by a low piezoelectric property. If ceramic is used to improve the piezoelectric property, problems occur in that durability is weak and there is a limitation in a size of the ceramic.

If a film-type piezoelectric element is applied to the display apparatus, a problem occurs in that a sound pressure is lower than in the sound system using an actuator. If a deposited film-type piezoelectric element including several film-type piezoelectric layers is applied to the display apparatus to improve a sound pressure, a problem occurs in that power consumption is increased. For example, although the film-type piezoelectric element may be applied to a flexible display apparatus, it has been recognized that it is difficult to implement the film-type piezoelectric element due to brittleness.

SUMMARY

Accordingly, the present disclosure is directed to a display apparatus that substantially obviates one or more of the issues due to limitations and disadvantages of the related art.

An aspect of the present disclosure is to provide a display apparatus including at least one vibration module on a rear surface of a display panel and wound or unwound together with the display panel to match positions where image and sound of the display apparatus are generated with each other, thereby improving a stereoscopic effect of the sound and improving an immersion experience of a viewer.

Another aspect of the present disclosure is to provide a display apparatus including a plurality of rigid members on a rear surface of a display panel to support the display panel, which may be wound or unwound, without a separate rear structure or back cover.

Another aspect of the present disclosure is to provide a display apparatus including a plurality of rigid members to increase its mass and reduce its resonance frequency, thereby improving a sound pressure of a low pitched reproduction band and extending a reproduction frequency band.

Another aspect of the present disclosure is to provide a display apparatus that may wind or unwind a plurality of first portions having a piezoelectric property together with a display panel by arranging a width of each of the plurality of first portions to correspond to a width of each of a plurality of rigid members and improve a sound pressure by increasing or maximizing the width of each of the plurality of first portions.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a display apparatus, including: a display panel configured to be rolled or unrolled, at least one vibration module on a rear surface of the display panel, the at least one vibration module being configured to: be rolled or unrolled with the display panel, and vibrate the display panel, and a partition on the rear surface of the display panel, the partition being spaced apart from and surrounding the at least one vibration module, wherein the at least one vibration module includes: a plurality of first portions having a piezoelectric property, and a plurality of second portions between the plurality of first portions, the plurality of second portions having flexibility.

In another aspect, there is provided a display apparatus, including: a display panel including a first area and a second area, the display panel being configured to display an image, a housing module including a roller configured to allow the display panel to be rolled-up therein, a rolling module including a structure connected to the display panel, the rolling module being configured to unroll the display panel in accordance with unfolding of the structure by rotation of the roller, a plurality of vibration modules on a rear surface of the display panel, the plurality of vibration modules being configured to: be rolled or unrolled with the display panel, and vibrate the first area and the second area of the display panel in an unrolled state, and a partition on the rear surface of the display panel, the partition being spaced apart from and surrounding the plurality of vibration modules.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

Figure 1:
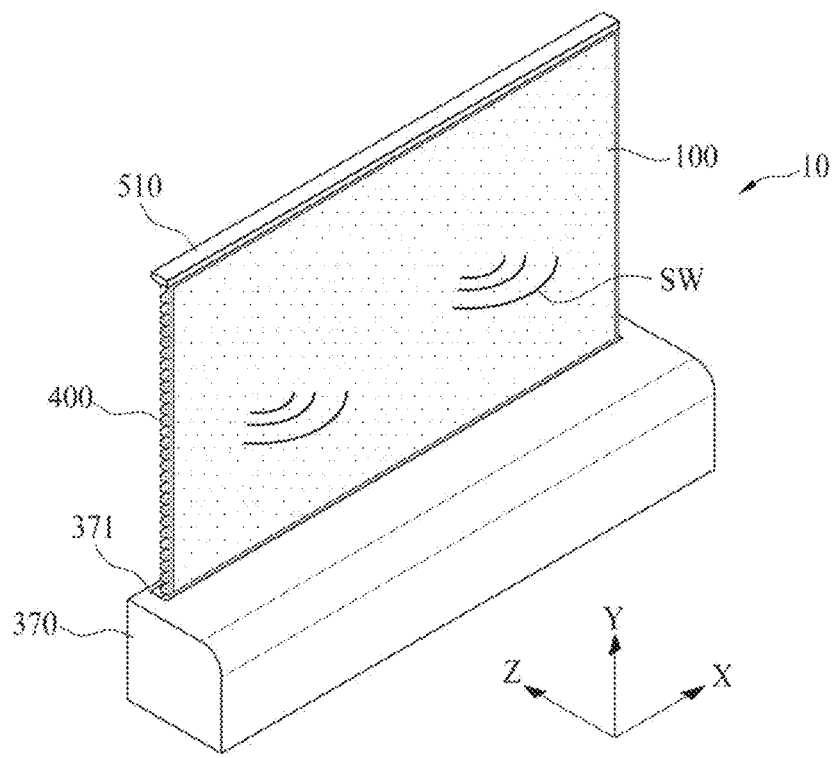
FIG. 1 is a front perspective view of a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

In this application, the terms "rolling," "rolling up," and "winding" may be synonymously used. Likewise, the terms "unrolling" and unwinding" may be synonymously used.

In the present disclosure, a "display apparatus" may include a liquid crystal module (LCM) or an organic light-emitting display module (OLED), which includes a display panel and a driver for driving the display panel. The display apparatus may include a set electronic apparatus or set device (or set apparatus), such as a notebook computer, a television, a computer monitor, an automotive apparatus, an equipment apparatus of another vehicle type, and a mobile electronic apparatus such as a smartphone or an electronic pad, which correspond to complete products or final products including an LCM and an OLED module.

As the display panel in the present disclosure, all kinds of display panels, such as a liquid crystal display panel, an OLED display panel, and an electroluminescent display panel may be used. The display panel in this embodiment is not limited to a specific display panel that may be vibrated by a sound generator to generate a sound. The display panel used in the display apparatus according to the embodiment of the present disclosure is not limited to a shape or size of the display panel.

For example, if the display panel is a liquid crystal display panel, the display panel includes a plurality of gate and data lines, and pixels formed in crossing areas of the gate lines and the data lines. Also, the display panel may include an array substrate including a thin film transistor that is a switching element for controlling light transmittance in each pixel, an upper substrate including a color filter and/or a black matrix, and a liquid crystal layer formed between the array substrate and the upper substrate.

If the display panel is an OLED display panel, the display panel may include a plurality of gate and data lines, and pixels formed in crossing areas of the gate lines and the data lines. Also, the display panel may include an array substrate including a thin film transistor that is an element for selectively applying a voltage to each pixel, an OLED layer on the array substrate, and an encapsulation substrate arranged on the array substrate to cover the OLED layer. The encapsulation substrate may protect the thin film transistor and the OLED layer from external impact, and may prevent water or oxygen from being permeated into the OLED layer. The layer formed on the array substrate may include an inorganic light-emitting layer, for example, a nano-sized material layer or a quantum dot. As another example, the inorganic light-emitting layer may include a micro light-emitting diode.

Hereinafter, a display apparatus according to an embodiment of the present disclosure will be described in detail with reference to the accompanying drawings. In adding reference numerals to elements of each of the drawings, although the same elements are illustrated in other drawings, like reference numerals may refer to like elements.

The inventors of the present disclosure have done several tests to implement a vibration module that can improve piezoelectric property and rigidity. The inventors of the present disclosure have invented a new type display apparatus comprising a vibration module that can improve piezoelectric property and rigidity through several tests.

Figure 2:
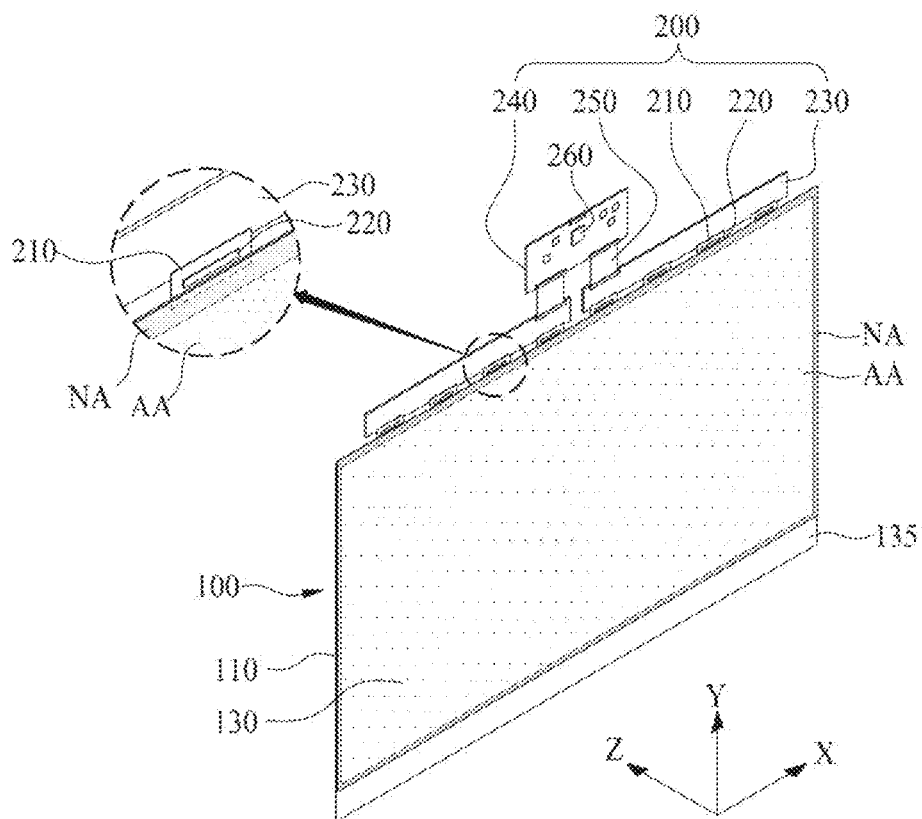
FIG. 2 is a display panel and a panel driver in a display apparatus according to an embodiment of the present disclosure.
Figure 3:
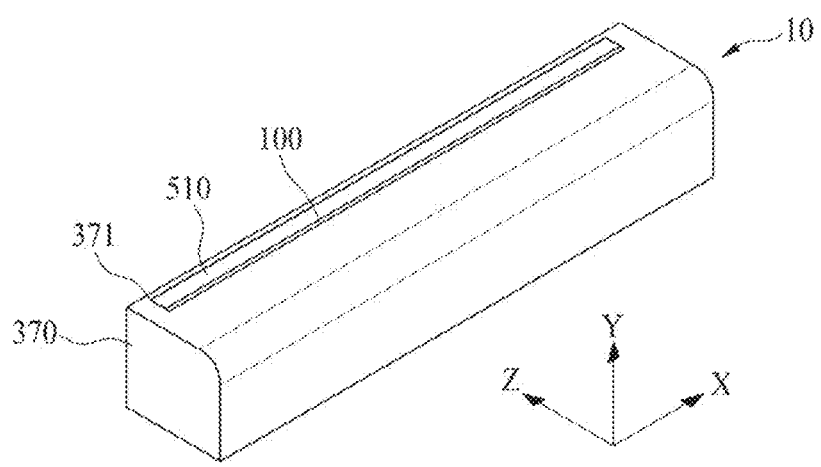
FIG. 3 is a display panel accommodated into a housing module in a display apparatus according to an embodiment of the present disclosure.
Figure 4:
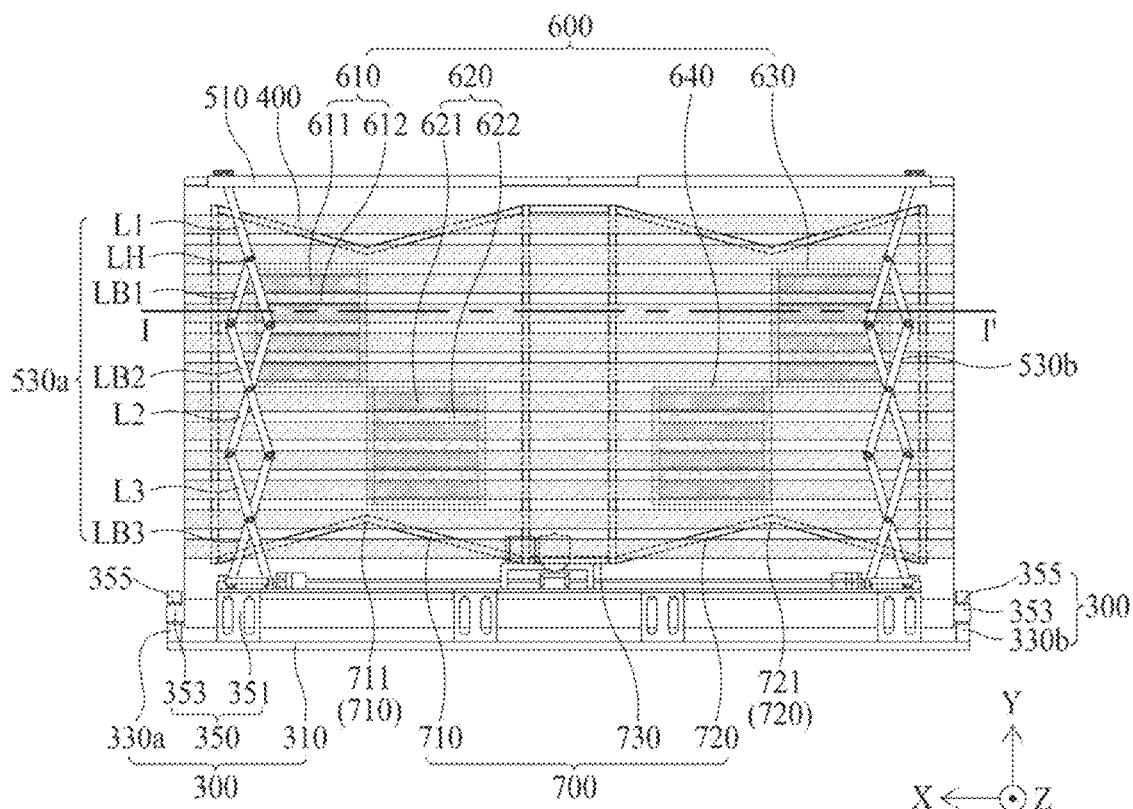
FIG. 4 is a rear view of a display apparatus according to an embodiment of the present disclosure.
Figure 5:
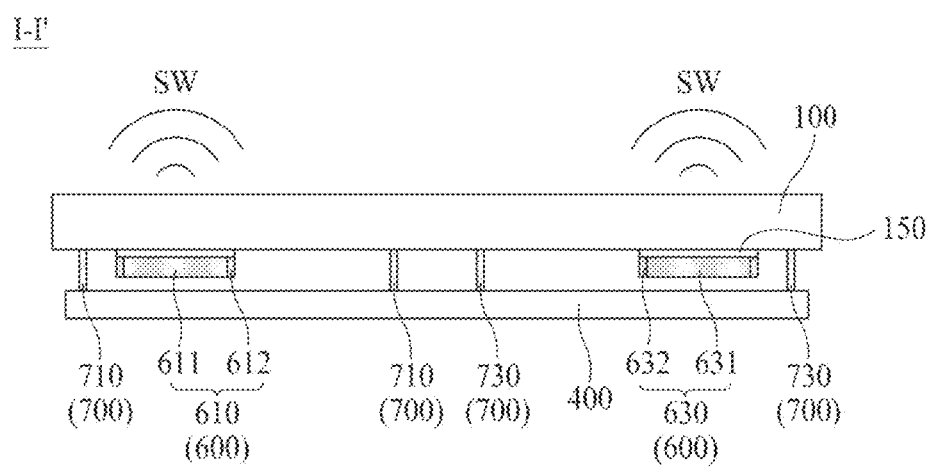
FIG. 5 is a cross-sectional view taken along line I-I' of FIG. 4.
Figure 6:
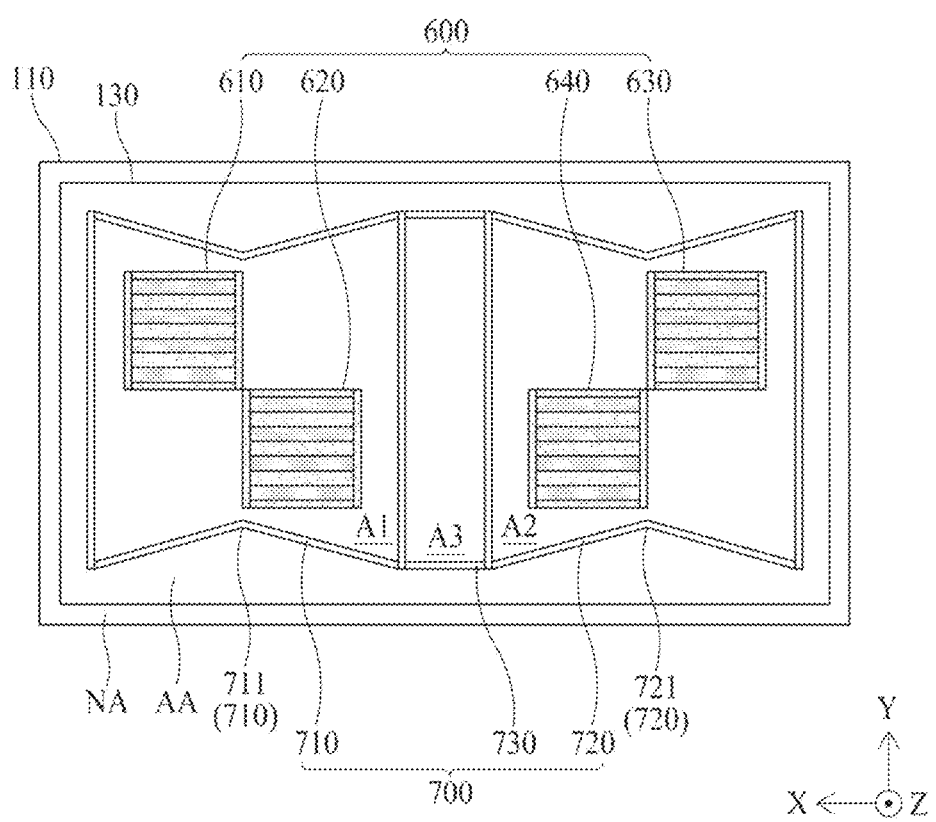
FIG. 6 is a rear view of first to third areas in the display apparatus of FIG. 4.
Figure 7:
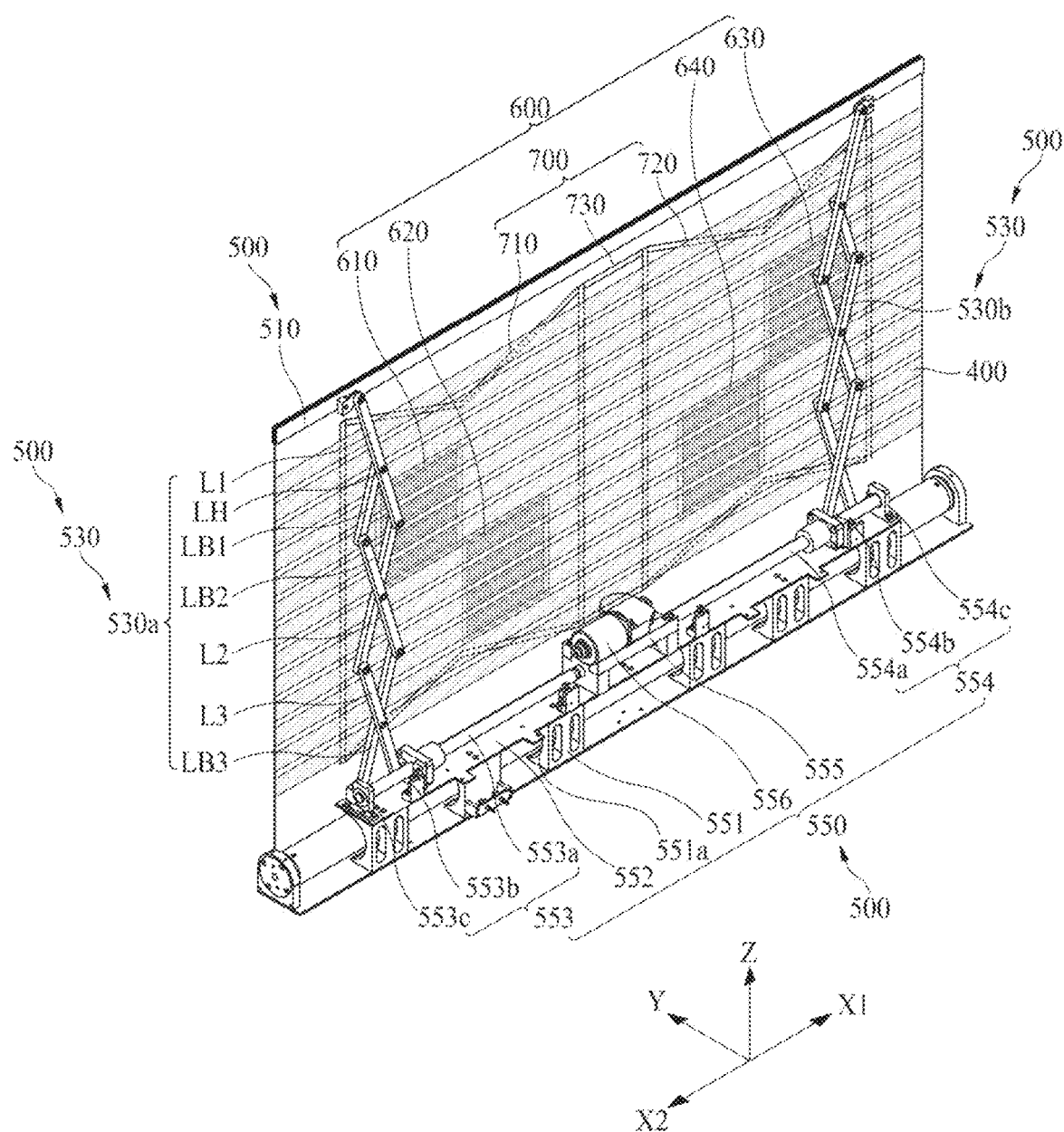
FIG. 7 is a rear perspective view of a state in which a structure of a rolling module is unrolled in the display apparatus of FIG. 4.
Figure 8:
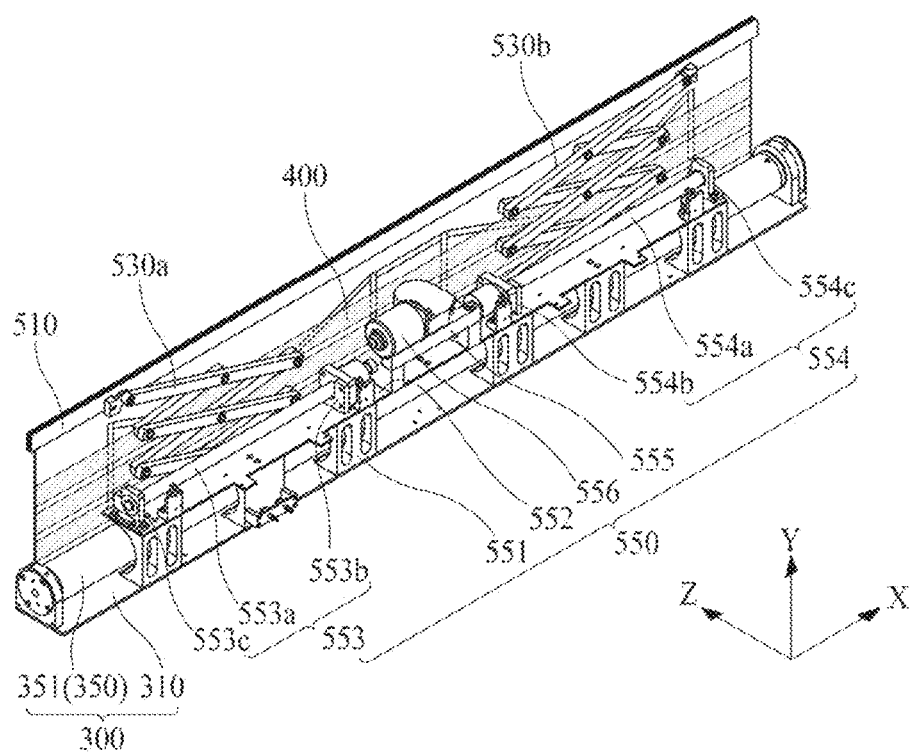
FIG. 8 is a rear perspective view of a state in which a structure of a rolling module is folded in the display apparatus of FIG. 4.

FIG. 1 is a front perspective view of a display apparatus according to an embodiment of the present disclosure. FIG. 2 is a display panel and a panel driver in a display apparatus according to an embodiment of the present disclosure. FIG. 3 is a display panel accommodated into a housing module in a display apparatus according to an embodiment of the present disclosure. FIG. 4 is a rear view of a display apparatus according to an embodiment of the present disclosure. FIG. 5 is a cross-sectional view taken along line I-I' of FIG. 4. FIG. 6 is a rear view of first to third areas in the display apparatus of FIG. 4. FIG. 7 is a rear perspective view of a state in which a structure of a rolling module is unrolled in the display apparatus of FIG. 4. FIG. 8 is a rear perspective view of a state in which a structure of a rolling module is folded in the display apparatus of FIG. 4.

With reference to FIGS. 1 to 8, a display apparatus 10 may include a display panel 100, a panel driver 200, a housing module 300, a plurality of rigid members 400, a rolling module 500, at least one vibration module 600, and a partition 700.

The display panel 100 may be implemented as any kind of display panel, such as a liquid crystal display panel, an organic light-emitting diode (OLED) display panel, a quantum dot light-emitting display panel, a micro light-emitting diode display panel, and an electrophoresis display panel. For example, the display panel 100 according to an embodiment of the present disclosure may be vibrated by at least one vibration module 600 to output a sound wave (or sound) or may generate a haptic feedback responding to a touch, and is not limited to a specific type of display panel.

With reference to FIGS. 7 and 8, the display panel 100 may be wound (or inserted) when a structure 530 is folded, and may be unwound (or extracted or unrolled) when the structure 530 is unfolded. For example, the structure 530 may be folded when a roller 350 is rotated in a forward direction, and may be unfolded when the roller 350 is rotated in a reverse direction. A rolling module 500 may be connected with the roller 350 to rotate the roller 350 in a forward direction or a reverse direction. According to an embodiment, the display panel 100 may display an image in an unwound or unrolled state. Therefore, the rolling module 500 may facilitate the insertion or extraction of the display panel 100, and may maintain the display panel 100 in a flat state.

The display panel 100 may include a plurality of pixels for displaying an image based on image data. The display panel 100 may be wound (or inserted or rolled) into the housing module 300, or may be unwound (or ejected) from the housing module in accordance with driving of the rolling module 500, whereby the display panel 100 may be unfolded in a flat state. The display panel 100 may display a two-dimensional image or a three-dimensional image including a still image or a moving image in a state in which a whole display area AA is fully unfolded or unrolled in a plane state. Vibration from the vibration module 600 may be transferred to the display panel 100, which may be unfolded in a plane state, whereby the display panel 100 may output sound SW to the front of the display apparatus.

According to an embodiment, the display panel 100, which may be unfolded or unrolled, may serve as a panel speaker (or vibration plate) vibrated in accordance with vibration of at least one vibration module 600 to output sound SW. For example, the display area AA of the unfolded display panel 100 may display an image through pixels, and at the same time may output the sound by being vibrated in accordance with vibration of the vibration module 600. For example, the display apparatus may include a plurality of vibration modules 600, and a vibration area of the display panel 100 may be adjusted in accordance with the number and position of the plurality of vibration modules. Therefore, the display apparatus according to an embodiment of the present disclosure may output the sound SW in various sound ranges in accordance with a size of a panel vibration area.

With reference to FIG. 2, the display panel 100 may include an array substrate 110 and an encapsulation substrate 130. The array substrate 110 may include a display area AA, a non-display area NA, and a pad portion. The display area AA may include a pixel array layer and a protective layer. The pixel array layer may include a plurality of pixels in pixel areas defined by a plurality of data and gate lines arranged on the array substrate 110.

Each of the plurality of pixels may include a pixel driving circuit and a self-light-emitting diode. The pixel driving circuit may allow the self-light-emitting diode to emit light based on a data signal supplied through a corresponding data line. The pixel driving circuit may include a driving thin film transistor that may supply a data current corresponding to the data signal to the self-light-emitting diode. The self-light-emitting diode may emit light proportional to the amount of a current supplied form the pixel driving circuit, and may include, for example, an organic light-emitting diode layer, a quantum dot light-emitting diode layer, or a light-emitting diode chip. Although each of the plurality of pixels may have a bottom-emission structure in which light may be emitted to the outside through the array substrate 110, embodiments are not limited thereto. For example, each pixel may have a top-emission structure.

The protective layer may be on the array substrate 110, and may surround the pixel array layer. For example, the protective layer may reduce or prevent oxygen or water from being permeated into the self-light-emitting diode. According to an embodiment, the protective layer may include at least an inorganic film. For example, the inorganic film may include at least one of: a silicon nitride, an aluminum nitride, a zirconium nitride, a titanium nitride, a hafnium nitride, a tantalum nitride, a silicon oxide, an aluminum oxide, and a titanium oxide, but embodiments are not limited thereto.

According to an embodiment, the protective layer may further include at least one organic film. The organic film may have a sufficient thickness to prevent particles from being permeated into the self-light-emitting diode by passing through the inorganic film. The protective layer may be expressed as, but is not limited to, an encapsulation layer.

The non-display area NA may correspond to a periphery portion of the array substrate 110 surrounding the display area AA. The pad portion may be provided on a first non-display area of the non-display area NA, and may be connected with the plurality of data lines arranged on the display area AA. For example, the first non-display area may correspond to an upper periphery portion of the array substrate 110 having a relatively long length in the non-display area NA.

The encapsulation substrate 130 may cover a front surface of the array substrate 110, except for the first non-display area of the pixel array substrate 100. According to an embodiment, the encapsulation substrate 130 may be attached to the front surface of the array substrate, e.g., by an adhesive or a filler. The encapsulation substrate 130 may reuce or prevent oxygen or water from permeating into the self-light-emitting diode.

With reference to FIGS. 2 to 4, the display panel 100 may further include a roller connector 135. The roller connector 135 may be at a lower portion (or fourth non-display area) of the display panel 100, and may be connected to the roller 350 of the housing module 300. For example, the lower portion of the display panel 100 may be connected to a rolling unit 351 of the roller 350 through the roller connector 135. The roller connector 135 may avoid or prevent the lower portion of the display area AA from being covered by the housing module 300 when the whole display area AA of the display panel 100 is fully unfolded or unrolled in a plane state. For example, one portion of the roller connector 135 may be connected to the lower portion of the display panel 100, and another portion may be connected to the roller 350. When the whole display area AA of the display panel 100 is fully unfolded in a plane state, one side of the roller connector 135 may be within or on a panel entrance 371.

According to an embodiment, the roller connector 135 may include a flexible plate having one portion attached to the lower portion of the display panel 100, and another portion attached to the roller 350. For example, a length of an intermediate portion, other than one portion and the other portion of the flexible plate, may be equal to or longer than a length between the panel gate 371 and the rolling unit 351 of the housing module 300. For example, the flexible plate may include a plastic material or a metal material, but embodiments are not limited thereto.

According to another embodiment, the roller connector 135 may correspond to an extension portion extended from a lower portion of the encapsulation substrate 130 to be attached to the roller 350. The extension portion may extend from the lower portion of the encapsulation substrate 130 to have a length equal to or longer than that between the panel gate 371 and the rolling unit 351.

With reference to FIG. 2, the panel driver 200 may include a plurality of flexible circuit films 210, a data driving integrated circuit 220, a printed circuit board 230, a control board 240, a signal cable 250, and a timing controller 260. Each of the plurality of flexible circuit films 210 may be attached between the pad portion of the array substrate 110 and the printed circuit board 230 by a film attachment process, and may include a tape carrier package (TCP) or a chip on flexible board or chip on film (COF).

The data driving integrated circuit 220 may be packaged in each of the plurality of flexible circuit films 210, and may be connected to the pad portion through the flexible circuit films 210. The data driving integrated circuit 220 may receive a data control signal and pixel data supplied from the control board 240, may convert the pixel data to an analog type data signal in accordance with the data control signal, and may supply the converted data signal to a corresponding data line through the pad portion.

The printed circuit board 230 may be connected with the plurality of flexible circuit films 210. The printed circuit board 230 may supply the signal supplied from the control board 240 and a driving power source to the data driving integrated circuit 220 and a gate driving circuit to display an image on each pixel. For example, various signal lines and various power lines may be provided on the printed circuit board 230. For example, on or more printed circuit boards 230 may be provided in accordance with the number of the flexible circuit films 210.

The control board 240 may be connected with the printed circuit board 230 through the signal cable 250. The control board 240 may package the timing controller 260, various power circuits, and a memory device therein.

The timing controller 260 may generate pixel data by aligning digital image data, which may be input from a host system (or driving system), to be suitable for a pixel arrangement structure of the display panel 100, and may provide the generated pixel data to the data driving integrated circuit 220. Also, the timing controller 260 may control a driving timing of each of the data driving integrated circuit 220 and the gate driving circuit by generating each of the data control signal and the gate control signal based on a timing synchronization signal supplied from the host system. For example, the timing controller 260 may be implemented as an integrated circuit or as a semiconductor chip, and may be packaged in the control board 240 or the printed circuit board 230.

According to an embodiment, the panel driver 200 may further include a gate driving circuit on the array substrate 110. For example, the gate driving circuit may be on the non-display area NA of the array substrate 110. The gate driving circuit may generate a gate signal in accordance with externally provided gate control signal, and may supply the generated gate signal to the gate line corresponding to a certain order.

According to an embodiment, the gate driving circuit may be formed on the non-display area NA of the array substrate 110 together with a driving thin film transistor. For example, the gate driving circuit may be on at least one of a second non-display area and a third non-display area of the array substrate 110. For example, the second non-display area may correspond to a left periphery portion of the array substrate 110, which may have a length relatively shorter than that of the first non-display area. For example, the third non-display area may correspond to a right periphery portion of the array substrate 110, which may be parallel with the second non-display area. However, it is to be noted that the structure of the panel driver 200 and the connection relationship between the panel driver 200 and the display panel 100 are not limited to those shown in FIG. 2, and other structures of the panel driver 200 and other connection relationships between the panel driver 200 and the display panel 100, which are omitted for ease of description, may also be applied in the present disclosure.

With reference to FIG. 4, the housing module 300 may correspond to a main body case of the display apparatus. For example, the housing module 300 may support the rolling module 500, and may be connected with the lower portion of the display panel 100. According to an embodiment, the housing module 300 may include a housing plate 310, a pair of roller brackets 330a and 330b, a roller 350, and a housing cover 370. Alternatively, the housing module 300 may include a housing plate 310, a roller bracket 330, a roller 350, and a housing cover 370.

The housing plate 310 may be on the bottom or lower portion of the housing module 300, and may support the rolling module 500. The pair of roller brackets 330a and 330b may be at respective sides or peripheries of the housing plate 310 based on a first direction X, and may rotatably support the roller 350. For example, the first direction X may correspond to a horizontal length direction (or long side length direction) of the display panel 100.

The roller 350 may be rotatably disposed between the pair of roller brackets 330a and 330b, and may be wind or unwind (e.g., roll or unroll) the display panel 100 by interworking or connecting with driving of the rolling module 500. According to an embodiment, the roller 350 may include a rolling unit 351 connected to the lower portion of the display panel 100, and a pair of roller shafts 353 rotatably arranged at both sides of the rolling unit 351 with respect to the pair of roller brackets 330a and 330b. For example, the rolling unit 351 may have, but is not limited to, a cylindrical shape. That is, the rolling unit 351 may have various shapes that can wind the display panel 100. Each of the pair of roller shafts 330a and 330b may be rotatably arranged in the pair of roller brackets 330a and 330b through a bearing 355, for example, a rolling bearing.

The roller 350 may further include a spiral spring in the rolling unit 351 or the pair of roller brackets 330a and 330b. One end of the spiral spring may be fixed to the roller shaft 353, and another end may be fixed to an inner surface of the rolling unit 351. The spiral spring may be compressed when the display panel 100 is unwound, and may provide a rotational force according to a compression restoring force to the rolling unit 351 when the display panel 100 is wound, whereby a load of the rolling module 500 may be reduced when the display panel 100 is wound. Therefore, the display panel 100 may be wound along an outer circumference of the rolling unit 351 by the rotational force according to the compression restoring force of the spiral spring.

The housing cover 370 may cover the pair of roller brackets 330a and 330b and the roller 350 on the housing plate 310 to avoid or prevent external exposure of the housing plate 310, the pair of roller brackets 330a and 330b, and the roller 350. The housing cover 370 may include a panel gate 371 through which the display panel 100 may move.

With reference to FIG. 4, the plurality of rigid members 400 may be on a partition 700 in the rear surface of the display panel 100. The plurality of rigid members 400 may be spaced apart from the display panel 100 by interposing the partition 700 therebetween. The plurality of rigid members 400 may be spaced apart from at least one vibration member 600 attached to the rear surface of the display panel 100 by the partition 700. The plurality of rigid members 400 may extend in the first direction X, and may be spaced apart from each other in a second direction Y vertical to the first direction X. For example, the first direction X may be a horizontal direction (or long side direction) of the display panel 100, and the second direction Y may be a vertical direction (or short side direction) of the display panel 100. The plurality of rigid members 400 may be arranged at constant intervals or distances on a rear surface of the partition 700. For example, the plurality of rigid members 400 may be attached to the rear surface of the partition 700 to support the display panel 100, which may be unfolded. Also, when the plurality of rigid members 400 are spaced apart from each other along the second direction Y in a state that they are not coupled or connected to each other, the plurality of rigid members 400 may be wound together with the display panel 100 when the display panel 100 is wound, even though the plurality of rigid members 400 may include a highly rigid material.

According to an embodiment, an arrangement direction of the plurality of rigid members 400 may be the same as that of a plurality of first portions 611 of a first vibration module 610. For example, the plurality of rigid members 400 may extend in the first direction X, and may be spaced apart from each other in the second direction Y vertical to the first direction X. The plurality of first portions 611 may extend in the first direction X, and may be spaced apart from each other in the second direction Y. Therefore, the plurality of rigid members 400 and the plurality of first portions 611 may be arranged in parallel, and may be wound or unwound together with the display panel 100.

The plurality of rigid members 400 may be spaced apart from each other at a certain distance along the second direction Y. When the plurality of rigid members 400 are spaced apart from each other along the second direction Y, the rigid members 400 may be wound together with the display panel 100 when the display panel 100 is wound. For example, the plurality of rigid members 400 may include one or more of: a plastic material, a metal material and a glass material, but embodiments are not limited thereto. For example, the plurality of rigid members 400 may include aluminum (Al) or stainless steel, but embodiments are not limited thereto. For example, the plurality of rigid members 400 may perform a heat dissipation function capable of emitting heat that may be generated during vibration of the vibration module 600.

According to an embodiment, a width (or length of the second direction Y) of each of the plurality of rigid members 400 may be inversely proportional to a curvature of the display panel 100. For example, as the curvature of the display panel 100 is reduced, the width of each of the plurality of rigid members 400 may increase. If the curvature of the display panel 100 is reduced, the display panel 100 may be wound along a relatively large circle. For example, each of the plurality of rigid members 400 may have a certain width set in accordance with the curvature of the display panel 100, and may be wound together with the display panel 100. When the display apparatus according to an embodiment of the present disclosure includes the plurality of rigid members 400, the display apparatus may support the display panel 100, even without a separate rear structure on the rear surface of the display panel 100. If the display apparatus includes a rear structure formed in a single body, including a metal material of high rigidity, the rear structure may have a problem in that it cannot be wound together with the display panel. However, when the display apparatus according to an embodiment of the present disclosure includes the plurality of rigid members 400 spaced apart from each other along the second direction Y, having a width reversely proportional to the curvature of the display panel 100, the plurality of rigid members 400 may be wound together with the display panel 100 when the display panel 100 is wound, even though the plurality of rigid members 400 may include a material of high rigidity.

According to an embodiment, the plurality of rigid members 400 may increase a mass of the display panel 100 to which at least one vibration module 600 is attached. Therefore, resonance frequency of the display panel 100 may be reduced, and the lowest pitched sound range (or the lowest reproduction frequency) that may be reproduced by the display panel 100 may be reduced to improve a sound pressure of a low-pitched reproduction band and extend a reproduction frequency band.

Therefore, because the display apparatus 10 according to an embodiment of the present disclosure includes the plurality of rigid members 400, the display apparatus may stably support the display panel 100, which may be wound or unwound, even without a separate rear structure, and may improve flatness of a sound pressure by improving the sound pressure of the low-pitched reproduction band.

According to an embodiment, the width (or length of the second direction Y) of each of the plurality of rigid members 400 may be at least a width (or length of the second direction Y) of each of the plurality of first portions 611. The plurality of first portions 611 may overlap the plurality of rigid members 400, and at least a portion of a plurality of second portions 612 may not overlap the plurality of rigid members 400. For example, the plurality of first portions 611 may correspond to the plurality of rigid members 400, and at least a portion of the plurality of second portions 612 may not correspond to the plurality of rigid members 400. Therefore, the width of each of the plurality of first portions 611 having a piezoelectric property may be increased or maximized within the range that may not exceed the width of each of the plurality of rigid members 400. The display apparatus 10 according to an embodiment of the present disclosure may increase the sound pressure output from the display panel 100 by increasing the width of each of the plurality of first portions 611. Therefore, the display apparatus 10 according to an embodiment of the present disclosure may wind or unwind the plurality of first portions 611 together with the display panel 100 by the width of each of the plurality of first portions 611 corresponding to the width each of the plurality of rigid members 400, and the display apparatus 10 may improve the sound pressure by increasing or maximizing the width of each of the plurality of first portions 611.

According to an embodiment, the plurality of rigid members 400 may be on the rear surface of at least one vibration module 600, whereby vibration generated in at least one vibration module 600 may be concentrated on the display panel 100. The plurality of rigid members 400 may ensure a vibration space of at least one vibration module 600, and may shield or block sound generated from at least one vibration module 600 or from being distorted by being reflected toward the rear surface of the display panel 100. Therefore, because the display apparatus 10 according to an embodiment of the present disclosure may include the plurality of rigid members 400, the display apparatus 10 may improve its sound pressure characteristic.

With reference to FIGS. 7 and 8, the rolling module 500 may wind or unwind the display panel 100 in accordance with folding or unfolding of a structure 530 according to forward rotation or reverse rotation of the roller 350. The rolling module 500 may include a supporting frame 510, the structure 530, and a driving module 550.

The supporting frame 510 may be on an upper portion of the display panel 100, and may cover a periphery of the upper portion of the display panel 100, thereby covering the panel driver 200 connected to the display panel 100. The supporting frame 500 may be inserted into or ejected from the housing module 300 in accordance with folding or unfolding of the structure 530. For example, the supporting frame 510 may have a bar shape covering the periphery of the upper portion of the display panel 100, but embodiments are not limited thereto.

The structure 530 may include first and second structures 530a and 530b in parallel and connected between the supporting frame 510 and the driving module 550. The first structure 530a may be connected between one portion of the supporting frame 510 and the driving module 550, and may be folded or unfolded in accordance with driving of the driving module 550. According to an embodiment, the first structure 530a may include a plurality of links L1 to Ln connected to the supporting frame 510, and a plurality of link bars LB1 to LBn rotatably connected to each of the plurality of links L1 to Ln by a link hinge LH. For example, the plurality of links may include the first to $n^{th}$ links L1 to Ln, and the plurality of link bars may include the first to $n^{th}$ link bars LB1 to LBn.

The first link L1 may be rotatably arranged at one portion of the supporting frame 510. According to an embodiment, the first link L1 may include a first portion connected with one portion of the supporting frame 510, a second portion connected with the second link L2, and an intermediate portion including a hollow portion between the first portion and the second portion. For example, the intermediate portion of the first link L1 may accommodate the link hinge LH, and the first link L1 may be connected with the first link bar LB1 through the link hinge LH at the intermediate portion. For example, the first link L1 may have a linear shape or non-linear shape, which may have a certain length in accordance with a distance between one portion of the supporting frame 510 and the second link L2. The non-linear type first link L1 may include a bent portion at the intermediate portion.

The first link bar LB1 may be rotatably arranged in the first link L1 by the link hinge LH. According to an embodiment, the first link bar LB1 may include a first portion accommodated into the hollow portion and rotatably connected to the link hinge LH, and a second portion connected to the first link bar LB1. For example, the second portion of the first link bar LB1 may include a hollow portion that may accommodate the link hinge LH. Therefore, the first link bar LB1 may be connected with the first link L1 through the link hinge LH arranged at the first portion, and may be connected with the second link bar LB2 through the link hinge LH at the second portion.

The second link L2 may be rotatably arranged at second portion of the first link L1. According to an embodiment, the second link L2 may include a first portion connected with the first link L1, a second portion connected with the third link L3, and an intermediate portion including a hollow portion between the first portion and the second portion. For example, the intermediate portion of the second link L2 may accommodate the link hinge LH, and the second link L2 may be connected with the second link bar LB2 through the link hinge LH of the intermediate portion. The second portion of the second link L2 may include a hollow portion that may accommodate the link hinge. The second link L2 may be connected with the third link L3 through the link hinge LH at the hollow portion of the second portion. Therefore, the second link L2 may be connected with the first link L1 through the link hinge LH at the first portion, connected with the third link L3 through the link hinge LH at the second portion, and connected with the second link bar LB2 through the link hinge LH at the intermediate portion.

The third link L3 may be rotatably arranged at the second portion of the second link L2 by the link hinge LH. According to an embodiment, the third link L3 may include a first portion connected with the second link L2, a second portion connected with the first driving unit 553, and an intermediate portion including a hollow portion between the first portion and the second portion. For example, the intermediate portion of the third link L3 may include a hollow portion that may accommodate the link hinge LH. Therefore, the third link L3 may be connected with the second link L2 through the link hinge LH at the first portion, and may be connected with the third link bar LB3 through the link hinge LH at the intermediate portion.

The first structure 530a may include the first to $n^{th}$ links L1 to Ln and the first to $n^{th}$ link bars LB1 to LBn rotatably connected to each of the first to $n^{th}$ links L1 to Ln by the link hinge LH. For example, the first structure 530a may be folded or unfolded in accordance with a forward rotation or reverse rotation of the roller 350.

The second structure 530b may be connected between the other portion of the supporting frame 510 and the driving module 550 in parallel with the first structure 530a, and may be folded or unfolded in accordance with driving of the driving module 550. According to an embodiment, the second structure 530b may include a plurality of links L1 to Ln connected to the supporting frame 510 and a plurality of link bars LB1 to LBn rotatably connected to each of the plurality of links L1 to Ln by a link hinge LH. Because the plurality of links L1 to Ln and the plurality of link bars LB1 to LBn of the second structure 530b are substantially similar to those of the first structure 530a, except that the plurality of links L1 to Ln and the plurality of link bars LB1 to LBn are connected between the other portion of the supporting frame 510 and the driving module 550, the same reference numbers will be given to the links and the link bars of the second structure and their repeated description will be omitted.

The driving module 550 may wind or unwind the display panel 100 connected to the supporting frame 510 by folding or unfolding the first and second structures 530a and 530b in response to a user's (or viewer's) manipulation and inserting or ejecting supporting frame 510 connected to the first and second structures 530a and 530b into or from the housing module 300. According to an embodiment, the driving module 550 may include a plurality of fixing members 551, a support plate 552, a first driving unit 553, a second driving unit 554, a power transfer unit 555, and a driving motor 556.

The plurality of fixing members 551 may be arranged at the housing plate 310 of the housing module 300 at constant intervals or distances. Each of the plurality of fixing members 551 may surround a portion of the rolling unit 351 of the housing module 300. For example, an inner portion of each of the plurality of fixing members 551 may have a curved shape 551a surrounding a portion of the rolling unit 351, and may be spaced apart from the outer circumference of the rolling unit 351 as much as a certain distance. The inner portion of each of the plurality of fixing members 551 and the outer circumference of the rolling unit 351 may be spaced apart from each other at a winding thickness or more of the display panel 100 wound in the rolling unit 351.

The support plate 552 may be on the plurality of fixing members 551, and may be on the rolling unit 351. The support plate 552 may support the first driving unit 553, the second driving unit 554, and the power transfer unit 555.

The first driving unit 553 may fold or unfold the first structure 530a by a power transferred from the power transfer unit 555. According to an embodiment, the first driving unit 553 may include a first ball screw 553a, a first ball catch 553b, and a first link bracket 553c.

The first ball screw 553a may be on the support plate 552, and may be rotatably supported in each of the power transfer unit 555 and the first link bracket 553c. For example, one portion of the first ball screw 553a may be rotatably connected to the power transfer unit 555 and another portion of the first ball screw 553a may be rotatably supported in the first link bracket 553c.

The first ball catch 553b may be movably fitted into the first ball screw 553a to rotatably support the second portion of the $n^{th}$ link bar LBn in the first structure 530a. The first ball catch 553b may linearly move on the first ball screw 553a toward the first direction X by rotation of the first ball screw 553a, thereby linearly moving the $n^{th}$ link bar LBn toward the first direction X.

The first link bracket 553c may be at a periphery of one portion of the support plate 552. The first link bracket 553c may rotatably support the second portion of the $n^{th}$ link Ln in the first structure 530a while rotatably supporting the other portion of the first ball screw 553a.

The first driving unit 553 may fold the first structure 530a by moving the second portion of the $n^{th}$ link bar LBn toward a first liner direction X1 through a linear motion of the first linear direction X1 of the first ball catch 553b according to rotation of a first direction of the first ball screw 553a. For example, as the second portion of the $n^{th}$ link bar LBn moves toward the first linear direction X1, the first to $n^{th}$ links L1 to Ln and the first to $n^{th}$ link bars LB1 to LBn of the first structure 530a may be folded based on each of a plurality of link hinges LH.

Furthermore, the first driving unit 553 may unfold the first structure 530a by moving the second portion of the $n^{th}$ link bar LBn toward a second liner direction X2 through a linear motion of the second linear direction X2 of the first ball catch 553b according to rotation of a second direction of the first ball screw 553a. For example, rotation of the second direction of the first ball screw 553a may be opposite to rotation of the first direction, and the second linear direction X2 may be opposite to the first liner direction X1. For example, as the second portion of the $n^{th}$ link bar LBn moves toward the second linear direction X2, the first to $n^{th}$ links L1 to Ln and the first to $n^{th}$ link bars LB1 to LBn of the first structure 530a may be unfolded based on each of the plurality of link hinges LH.

The second driving unit 554 may fold or unfold the second structure 530b by the power transferred from the power transfer unit 555. According to an embodiment, the second driving unit 554 may include a second ball screw 554a, a second ball catch 554b, and a second link bracket 554c. For example, because the second ball screw 554a, the second ball catch 554*b*, and the second link bracket 554*c* of the second driving unit 554 correspond to the first ball screw 553*a*, the first ball catch 553*b*, and the first link bracket 553*c*, respectively, their repeated description will be omitted.

The power transfer unit 555 may be at the intermediate portion of the support plate 552 to transfer a rotational power of the driving motor 556 to one end of each of the first and second ball screws 553*a* and 554*a* while rotatably supporting one portion of each of the first and second ball screws 553*a* and 554*a*. According to an embodiment, the power transfer unit 555 may include a rotational gear and first and second pinion gears. The power transfer unit 555 that includes the rotational gear and the first and second pinion gears may be expressed a bevel gear box that includes a gear and a pinon. The driving motor 556 may be on the power transfer unit 555 to rotate the rotational gear of the power transfer unit 555 in response to the user's (or viewer's) manipulation.

With reference to FIGS. 4 to 6, at least one vibration module 600 may be on the rear surface of the display panel 100, may be wound or unwound together with the display panel 100, and may vibrate the display panel 100, which may be unfolded by being unwound. According to an embodiment, the display panel 100 may include a first area A1, a second area A2, and a third area A3. For example, the first area A1 may be a left area, the second area A2 may be a right area, and the third area A3 may be a center area. The terms "left" and "right" are used herein for convenience of explanation, and are interchangeable, as should be understood to one of ordinary skill in the art.

According to an embodiment, the display apparatus 10 may include first and second vibration modules 610 and 620 for vibrating the first area A1, and third and fourth vibration modules 630 and 640 for vibrating the second area A2. The first and second vibration modules 610 and 620 may be on the first area A1 of the display panel 100 to vibrate the first area A1 of the display panel 100. The third and fourth vibration modules 630 and 640 may be on the second area A2 of the display panel 100 to vibrate the second area A2 of the display panel 100. Therefore, the first area A1 of the display panel 100 may be used by the first and second vibration modules 610 and 620 as a vibration plate, and the second area A2 of the display panel 100 may be used by the third and fourth vibration modules 630 and 640 as a vibration plate, whereby sound SW may be output to the front of the display panel 100 and two-channel type stereo sound, by a sound split into left and right sides, may be output.

According to an embodiment, the first and second vibration modules 610 and 620 may be symmetrical to the third and fourth vibration modules 630 and 640 based on the center portion of the display panel 100. For example, an arrangement direction of a plurality of first portions 611 of the first vibration module 610 may be the same as an arrangement direction of a plurality of first portions 631 of the third vibration module 630. For example, an arrangement direction of a plurality of second portions 612 of the first vibration module 610 may be the same as an arrangement direction of a plurality of second portions 632 of the third vibration module 630. Also, an arrangement direction of a plurality of first portions of the second vibration module 620 may be the same as an arrangement direction of a plurality of first portions of the fourth vibration module 640. Hereinafter, a description will be given based on the first and second vibration modules 610 and 620, and a description of the third and fourth vibration modules 630 and 640 will be omitted for convenience of explanation.

The first vibration module 610 may be on the first area A1 of the display panel 100, and the second vibration module 620 may be arranged alternately with the first vibration module 610. Therefore, the first and second vibration modules 610 and 620 may be arranged along a diagonal line of the first direction X and the second direction Y, whereby a vibration area of the first area A1 of the display panel 100 may be increased, and sound pressure characteristic of the display apparatus 10 may be improved. Because the diagonal arrangement structure of the first and second vibration modules 610 and 620 has an effect similar to a plurality of vibration modules arranged in the first area A1 of the display panel 100 in a 2×2 structure, the number of vibration modules vibrating the first area A1 of the display panel 100 may be reduced by half. For example, the first and second vibration modules 610 and 620 may be arranged on the first area A1 alternately with each other such that a sound pressure of the first vibration module 610 may be compensated by the second vibration module 620, and a sound characteristic may be improved. As another example, the first and second vibration modules 610 and 620 may be arranged on the first area A1 alternately with each other such that a sound pressure of the second vibration module 620 may be compensated by the first vibration module 610, and a sound characteristic may be improved.

The plurality of first portions 611 and 621 of each of the first and second vibration modules 610 and 620 may extend to the second direction Y on a plane, and may be spaced apart from each other in the first direction X. Therefore, the first and second vibration modules 610 and 620 may be wound or unwound together with the display panel 100 and the plurality of rigid members 400 by matching an arrangement direction of the plurality of first portions 611 and 621 with an arrangement direction of the plurality of rigid members 400.

According to an embodiment, the width (or length of the second direction Y) of each of the plurality of first portions 611 and 621 may be proportional to the width (or length of the second direction Y) of each of the plurality of rigid members 400. For example, as the width of each of the plurality of rigid members 400 increases, the width of each of the plurality of first portions 611 and 621 may increase. The width of each of the plurality of first portions 611 and 621 having a piezoelectric property may be increased or maximized within the range that may not exceed the width of each of the plurality of rigid members 400. For example, each of the plurality of first portions 621 and 622 may have a certain width set in accordance with the width of each of the plurality of rigid members 400, may be wound together with the display panel 100, and a sound pressure of a sound output from the display panel 100 may be improved. Therefore, the display apparatus according to an embodiment of the present disclosure may wind or unwind the plurality of first portions 611 together with the display panel 100 by increasing or maximizing the width of each of the plurality of first portions 611 and 621 within the range that may not exceed the width of each of the plurality of rigid members 400, and may improve the sound pressure output from the display panel 100.

According to an embodiment, the first vibration module 610 may include a plurality of first portions 611 and a plurality of second portions 612. The plurality of first portions 611 may extend in the first direction X, and may be spaced apart from each other in the second direction Y. Each of the plurality of first portions 611 may include an inorganic material portion. The inorganic material portion may include an electroactive material. The electroactive material is characterized in that pressure or distortion acts on a crystalline structure by an external force, and thus a potential difference occurs by dielectric polarization according to a relative position change of positive (+) ions and negative (−) ions, whereas vibration occurs by an electric field according to an applied voltage.

Each of the plurality of second portions 612 may be between respective pairs of the plurality of first portions 611. Therefore, each of the plurality of first portions 611 and the plurality of second portions 612 may be arranged (or disposed) on the same plane (or same layer) in parallel. Each of the plurality of second portions 612 may fill a gap between two of the first portions 611 adjacent to each other, and thus may be connected with or adhered to the first portions 611 adjacent thereto. Therefore, because vibration energy by a link in a unit lattice of the first portion 611 may be increased by the second portion 612, a piezoelectric property and flexibility of the first vibration module 610 may be improved. Also, as the first portions 611 and the second portions 612 may be arranged alternately on the same plane along the first direction X, the first vibration module 610 may configure a large scaled composite film (or inorganic and organic composite film) having a single layered structure, wherein the large scaled composite film may have flexibility by the plurality of second portions 612.

According to an embodiment, each of the plurality of second portions 612 may include an organic material portion, and may fill a portion between inorganic material portions corresponding to the first portions 611. The organic material portions may be between the respective inorganic material portions, may absorb impact applied to the inorganic material portion (or the first portion), and may improve durability of the first vibration module 610 by releasing stress concentrated on the inorganic material portion. Also, flexibility may be provided to the first vibration module 610. Therefore, the first vibration module 610 may be wound or unwound together with the display panel 100 by including the plurality of second portions 612 having flexibility.

According to an embodiment, the width of each of the plurality of first portions 611 may correspond to the width of each of the plurality of rigid members 400. For example, the plurality of first portions 611 may overlap the plurality of rigid members 400, and at least a portion of a plurality of second portions 612 may not overlap the plurality of rigid members 400. For example, the plurality of first portions 611 may correspond to the plurality of rigid members 400, and at least a portion of the plurality of second portions 612 may not correspond to the plurality of rigid members 400. Therefore, the width of each of the plurality of first portions 611 having a piezoelectric property may be increased or maximized within the range that may not exceed the width of each of the plurality of rigid members 400. The display apparatus 10 may increase the sound pressure output from the display panel 100 by increasing the width of each of the plurality of first portions 611. Because the plurality of second portions 612 have flexibility, the plurality of second portions 612 may release stress concentrated on the plurality of first portions 611, and the first vibration module 610 may be wound or unwound together with the display panel 100.

Therefore, the display apparatus 10 according to an embodiment of the present disclosure may wind or unwind the plurality of first portions 611 together with the display panel 100 by the width of each of the plurality of first portions 611 corresponding to the width each of the plurality of rigid members 400, and may improve the sound pressure by increasing or maximizing the width of each of the plurality of first portions 611.

As described above, as the inorganic material portion (the first portion) and the organic material portion (the second portion) of the vibration module 600 of the display apparatus according to an embodiment of the present disclosure are on the same layer, impact transferred to the inorganic material portion may be absorbed by the organic material portion, whereby a damage of the inorganic material portion caused by impact externally applied to the display apparatus and vibration performance deterioration (or sound performance deterioration) caused by the damage may be reduced, minimized, or avoided.

Also, the vibration module 600 of the display apparatus according to an embodiment of the present disclosure may include a piezoelectric ceramic to ensure piezoelectric property, and may include a polymer material in the piezoelectric ceramic to complement impact resistance of the piezoelectric ceramic and implement flexibility. According to an embodiment, the vibration module 600 may include a piezoelectric having a perovskite crystalline structure, and may be vibrated (e.g., mechanical displacement) in response to an externally applied sound signal. For example, if an alternating current voltage is applied to the inorganic material portion (e.g., the first portion), the vibration module 600 may generate vibration by bending of which direction is changed alternately as the inorganic material portion is repeatedly contracted and expanded by an inverse piezoelectric effect. The display panel 100 may be vibrated by such vibration of the vibration module, whereby a sound or haptic feedback may be provided to a user.

According to an embodiment, the vibration module 600 may be adhered to the rear surface of the display panel 100 by the adhesive member 150 (or module adhesive member). The adhesive member 150 may be between the rear surface of the display panel 100 and the vibration module 600. For example, the adhesive member 150 may be a double-sided tape or adhesive, which includes an adhesive layer having an excellent adhesion with each of the rear surface of the display panel 100 and the vibration module 600. The adhesive layer of the adhesive member 150 may include, but is not limited to, epoxy, acryl, silicon, and/or urethane. The adhesive layer of the adhesive member 150 may further include an additive, such as a tackifier or an adhesive enhancing agent, a wax ingredient or an anti-oxidizer, wherein the additive may avoid or prevent the adhesive member 150 from being detached (or separated) from the display panel 100) by vibration of the vibration module 600. The tackifier may be, but is not limited to, a rosin derivative; the wax ingredient may be, but is not limited to, paraffin wax or the like; and the anti-oxidizer may be, but is not limited to, a phenolic anti-oxidizer, such as a thioester. Embodiments are not limited to these examples.

According to another embodiment, the adhesive member 150 may further include a hollow portion between the display panel 100 and the vibration module 600. The hollow portion of the adhesive member 150 may be provided with an air gap between the display panel 100 and the vibration module 600. The air gap may reduce or minimize loss due to vibration of the adhesive member 150 by concentrating the sound wave (or sound pressure) according to vibration of the vibration module 600 on the display panel 100, thereby increasing sound pressure characteristic of a sound generated in accordance with vibration of the display panel 100.

According to another embodiment, the vibration module 600 may be, but is not limited to, a sound actuator, a sound exciter, or an piezoelectric element, as a speaker. The vibration module 600 may be a sound system that outputs a sound in accordance with an electrical signal.

The partition 700 may be on the rear surface of the display panel 100, may be spaced apart from at least one vibration module 600, and may surround at least one vibration module 600. The partition 700 may reduce or prevent the sound generated by at least one vibration module 600 from departing from (escaping) the area surrounded by the partition 700. For example, the area surrounded by the partition 700 may be an air gap or space where the sound may be generated when the display panel 100 is vibrated by at least one vibration module 600. The air gap or space for generating the sound or transferring the sound may be the partition. The partition may split the sound or channel, and may prevent or reduce a generation of sound that is not transparent due to interference of the sound. The partition may be, but is not limited to, an enclosure or baffle. Therefore, the partition 700 may concentrate vibration generated by at least one vibration module 600 on the display panel 100.

According to an embodiment, the partition 700 may include a material having flexibility to be wound together with the display panel 100. For example, the partition 700 may include, but is not limited to, polyester, polyurethane, or polyolefin. For example, the partition 700 may be, but is not limited to, a foam tape material having a sound absorption property. As another example, the partition 700 may include single-sided tape or double-sided tape, or may include a material having certain elasticity.

According to an embodiment, the partition 700 may include a first partition 710 surrounding the first area A1 of the display panel 100, a second partition 720 surrounding the second area A2 of the display panel 100, and a third partition 730 surrounding the third area A3 of the display panel 100.

The first partition 710 may be spaced apart from the first and second vibration modules 610 and 620 to surround the first and second vibration modules 610 and 620, and the second partition 720 may be spaced apart from the third and fourth vibration modules 630 and 640 to surround the third and fourth vibration modules 630 and 640. For example, the first partition 710 may concentrate vibration generated from the first and second vibration modules 610 and 620 on the first area A1 of the display panel 100, the second partition 720 may concentrate vibration generated from the third and fourth vibration modules 630 and 640 on the second area A2 of the display panel 100, and the third partition 730 may reduce or prevent vibration generated from the first and second vibration modules 610 and 620 from interfering with vibration generated from the third and fourth vibration modules 630 and 640.

According to an embodiment, the first and second vibration modules 610 and 620 may vibrate the first area A1 of the display panel 100, and the first partition 710 may be spaced apart from the first and second vibration modules 610 and 620 to surround the first and second vibration modules 610 and 620. The first partition 710 may serve as a mass body that may be vibrated several times by inertia according to vibration. For example, the first partition 710 may increase an inertia moment of the first area A1, which may be vibrated by vibration of each of the first and second vibration modules 610 and 620. Therefore, the first partition 710 may reduce or prevent vibration generated from the first and second vibration modules 610 and 620 from passing through the first area A1.

Therefore, the first area A1 of the display panel 100 may act as a vibration plate for the first and second vibration modules 610 and 620 as an inertia moment is increased by the first partition 710. As a result, the first partition 710 may reduce or prevent interference of the sound generated from each of the first to fourth vibration modules 610, 620, 630, and 640 by reducing or preventing vibration of the first area A1 from passing through the first area A1.

According to an embodiment, the first partition 710 may include a bent portion 711 on at least one side. For example, each of two sides at upper and lower peripheries of the first area A1 may include a bent portion 711 having a certain inclined angle with respect to the first direction X. The bent portion 711 may be at a point where two linear portions meet at each of the upper and lower peripheries of the first area A1. For example, the bent portion 711 may have, but is not limited to, a linear shape, a curved shape, or a round shape.

According to an embodiment, the bent portion 711 may reduce sound pressure reduction of the sound generated from the first and second vibration modules 610 and 620. For example, the sound waves generated by vibration of the first area A1 vibrated by the first and second vibration modules 610 and 620 may progress while being radially transferred from the center of the first area A1. These sound waves may be referred to as "progressive waves." If these progressive waves meet at one side of the first partition 710, one side of the first partition 710 may be reflected to form reflected waves progressing in a direction opposite to the progressive waves. The reflected waves overlap or cancel the progressive waves, whereby standing waves that are stagnant at a certain position without progressing are formed. The sound pressure may be reduced by the standing waves, whereby a sound output characteristic may be deteriorated. Therefore, to reduce the sound pressure reduction caused by the standing waves generated by interference between the reflected waves and the progressive waves, the first partition 710 may include a bent portion. The standing waves that cause the sound pressure reduction are generated at a point where sizes of the progressive waves and the reflected waves are great. Therefore, the bent portion 711 may be at the position where the waves from a sound generating module are the greatest. According to an embodiment, the bent portion 711 may be bent toward the first and second vibration modules 610 and 620. According to another embodiment, the bent portion 711 of the first partition 710 may be bent toward the center of the first vibration module 610, and may be bent toward the center of the second vibration module 620. The bent portion that is bent toward the first vibration module 610 and the bent portion that is bent toward the second vibration module 620 may be asymmetrical to each other based on the first direction X.

According to an embodiment, the second partition 720 may include a bent portion 721 on at least one side. Because the description of the bent portion 721 of the second partition is the same as the description of the bent portion 711 of the first partition 710, a repeated description will be omitted. According to another embodiment, the bent portion 721 of the second partition 720 may be bent toward the center of the third vibration module 630. Therefore, the bent portion that is bent toward the third vibration module 630 and the bent portion that is bent toward the fourth vibration module 640 may be asymmetrical to each other based on the first direction X. The third partition 730 may not include the bent portion, or may include the bent portion.

In the embodiment of the present disclosure, a woofer may further be provided in a storage box of the display apparatus. Because a sound of a low pitched sound range may be improved by the woofer, the woofer may output a multi-channel type stereo sound.

Figure 9:
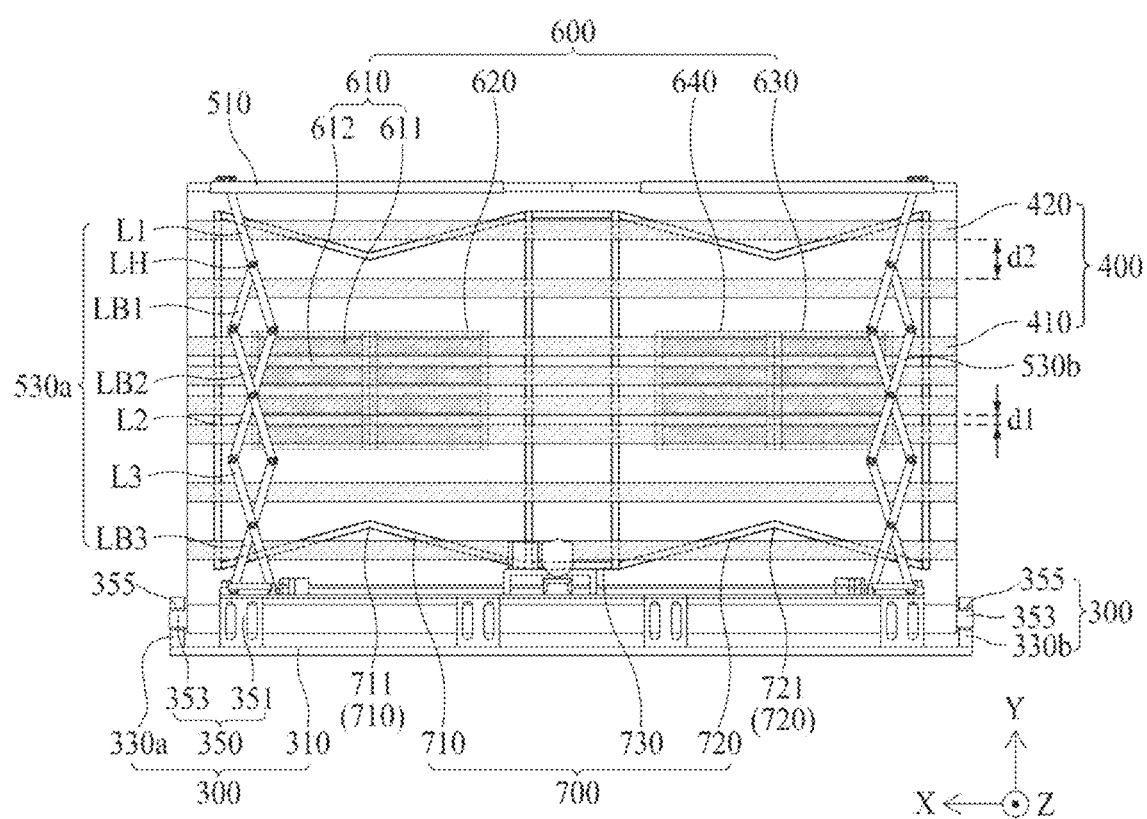
FIG. 9 is a rear view of a display apparatus according to another embodiment of the present disclosure.
Figure 10:
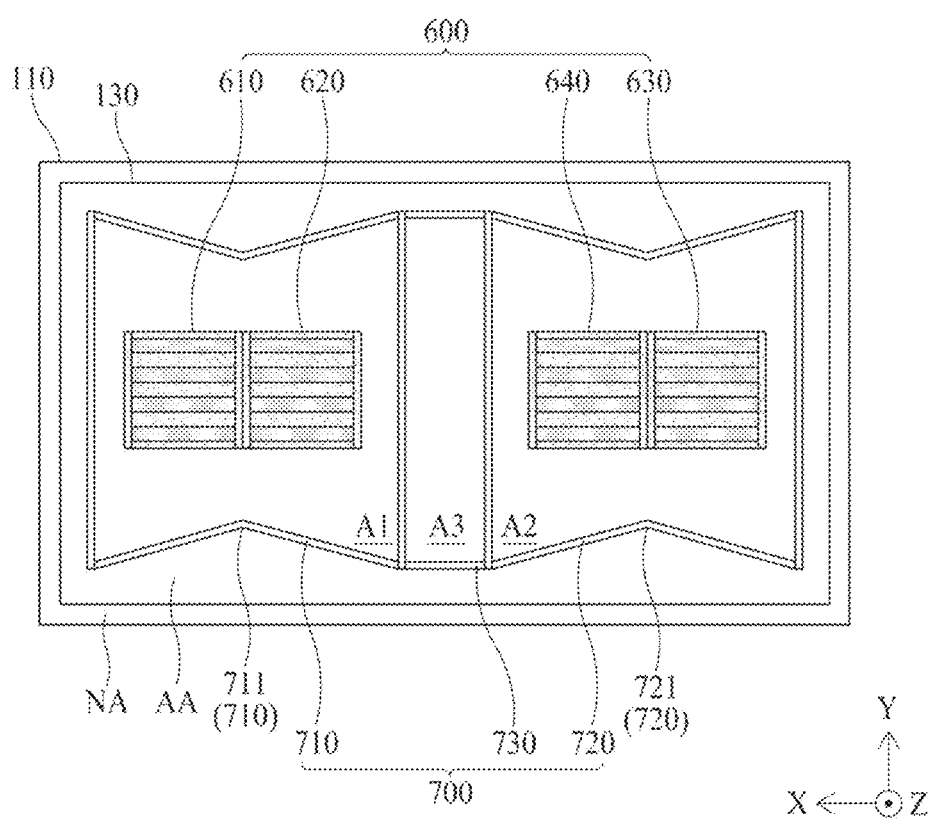
FIG. 10 is a rear view of first to third areas in the display apparatus of FIG. 9.

FIG. 9 is a rear view of a display apparatus according to another embodiment of the present disclosure. FIG. 10 is a rear view of first to third areas in the display apparatus of FIG. 9.

With reference to FIGS. 9 and 10, the display panel 100 may include first to third areas A1, A2, and A3. For example, the first area A1 of the display panel 100 may be a left area, the second area A2 may be a right area, and the third area A3 may be a center area. The first and second areas A1 and A2 may be symmetrical to each other based on the center portion of the display panel 100 or the third area A3.

The plurality of rigid members 400 may be on the rear surface of the display panel 100. According to an embodiment, the plurality of rigid members 400 may include a plurality of first rigid members 410 overlaping the first and second vibration modules 610 and 620, and a plurality of second rigid members 420 not overlapping the first and second vibration modules 610 and 620. For example, the plurality of rigid members 400 may include a plurality of first rigid members 410 corresponding to the first and second vibration modules 610 and 620, and a plurality of second rigid members 420 not corresponding to the first and second vibration modules 610 and 620.

The plurality of first rigid members 410 may overlap or correspond to the plurality of first portions 611 and 621 of each of the first and second vibration modules 610 and 620, and may be arranged at a first interval or distance d1. For example, so that the plurality of first rigid members 410 may overlap or correspond to the plurality of first portions 611 and 621, the plurality of first rigid members 410 may be arranged at a first interval or distance d1 that is smaller than a second interval or distance d2. The plurality of first rigid members 410 may concentrate vibration generated from the first and second vibration modules 610 and 620 on the first area A1 of the display panel 100. The plurality of first rigid members 410 may ensure a vibration space of the first and second vibration modules 610 and 620, and may shield the sound generated from the first and second vibration modules 610 and 620 from being reflected toward the rear surface of the display panel 100 and distorted. Therefore, the display apparatus 10 according to an embodiment of the present disclosure may include the plurality of first rigid members 410, thereby improving its sound pressure characteristic.

The plurality of second rigid members 420 may be arranged at the second interval or distance d2 without overlapping or corresponding to the first and second vibration modules 610 and 620 or the plurality of first portions 611 and 621. For example, the plurality of second rigid members 420 may support the display panel 100, and may reduce a resonance frequency of the display panel 100, regardless of the interval or distance of the plurality of first portions 611 and 621. Therefore, the plurality of second rigid members 420 may be arranged at the second interval or distance d2 greater than the first interval or distance d1.

Therefore, the display apparatus 10 according to an embodiment of the present disclosure may increase its mass by setting the width and the first interval or distance d1 of each of the plurality of first rigid members 410 and the width and the second interval or distance d2 of each of the plurality of second rigid members 420. For example, the first and second rigid members 410 and 420 may efficiently support the display panel 100, and at the same time may adjust the resonance frequency of the display panel 100. Therefore, the display apparatus 10 according to an embodiment of the present disclosure may stably support the display panel 100 in being wound or unwound, even without a separate rear structure, by including the plurality of first and second rigid members 410 and 420, and may improve flatness of the sound pressure by improving the sound pressure of the low-pitched reproduction band.

According to an embodiment, the display apparatus 10 may include first and second vibration modules 610 and 620 for vibrating the first area A1, and third and fourth vibration modules 630 and 640 for vibrating the second area A2. The first and second vibration modules 610 and 620 may overlap the first area A1 of the display panel 100 to vibrate the first area A1 of the display panel 100. For example, the first and second vibration modules 610 and 620 may correspond to the first area A1 of the display panel 100 to vibrate the first area A1 of the display panel 100. The third and fourth vibration modules 630 and 640 may correspond to the second area A2 of the display panel 100 to vibrate the second area A2 of the display panel 100. For example, the first area A1 of the display panel 100 may be used by the first and second vibration modules 610 and 620 as a vibration plate, and the second area A2 of the display panel 100 may be used by the third and fourth vibration modules 630 and 640 as a vibration plate, whereby sound SW may be output to the front of the display panel 100 and two-channel type stereo sound, by a sound split into left and right sides, may be output.

According to an embodiment, the first vibration module 610 may overlap or correspond to the first area A1 of the display panel 100, and the second vibration module 620 may be adjacent to the first vibration module 610 on a plane in the first direction X. For example, the first and second vibration modules 610 and 620 may be arranged along the first direction X, whereby a vibration area of the first area A1 of the display panel 100 may be increased, and a sound pressure characteristic of the display apparatus 10 may be improved.

According to an embodiment, the first and second vibration modules 610 and 620 may be on the same line of the first direction X. Therefore, an arrangement direction of the plurality of first portions 611 and 621 of each of the first and second vibration modules 610 and 620 may be the same as that of the plurality of first rigid members 410. The plurality of first portions 611 and 621 may overlap the plurality of first rigid members 410 arranged at the first interval or distance d1. For example, the plurality of first portions 611 and 621 may correspond to the plurality of first rigid members 410 arranged at the first interval or distance d1.

The bent portion 711 of the first partition 710 may be bent toward the first vibration module 610 and the second vibration module 620, and the bent portion 721 of the second partition 720 may be bent toward the third vibration module 630 and the fourth vibration module 640. According to another embodiment, the bent portion 711 of the first partition 710 may be bent toward the first vibration module 610, and may include at least two bent portions that may be bent toward the second vibration module 620. The bent portion 721 of the second partition 720 may be bent toward the third vibration module 630, and may include at least two bent portions that may be bent toward the third vibration module 630. The third partition 730 may not include the bent portion, or may include the bent portion. According to an embodiment, the width (or length of the second direction Y) of each of the plurality of first rigid members 410 may be the width (or length of the second direction Y) of each of the plurality of first portions 611 and 621 or more. The plurality of first portions 611 and 621 may overlap the plurality of first rigid members 410, and at least a portion of a plurality of second portions 612 and 622 may not overlap the plurality of first rigid members 410. For example, the plurality of first portions 611 and 621 may correspond to the plurality of first rigid members 410, and at least a portion of the plurality of second portions 612 and 622 may not correspond to the plurality of first rigid members 410.

The width of each of the plurality of first portions 611 and 621 having a piezoelectric property may be increased or maximized within the range that may not exceed the width of each of the plurality of first rigid members 410. The display apparatus 10 may increase the sound pressure output from the display panel 100 by increasing the width of each of the plurality of first portions 611 and 621. Therefore, the display apparatus according to an embodiment of the present disclosure may wind or unwind the plurality of first portions 611 and 621 together with the display panel 100 by the width of each of the plurality of first portions 611 and 621 corresponding to the width of each of the plurality of first rigid members 410, and may improve the sound pressure by increasing or maximizing the width of the plurality of first portions 611 and 621.

Figure 11:
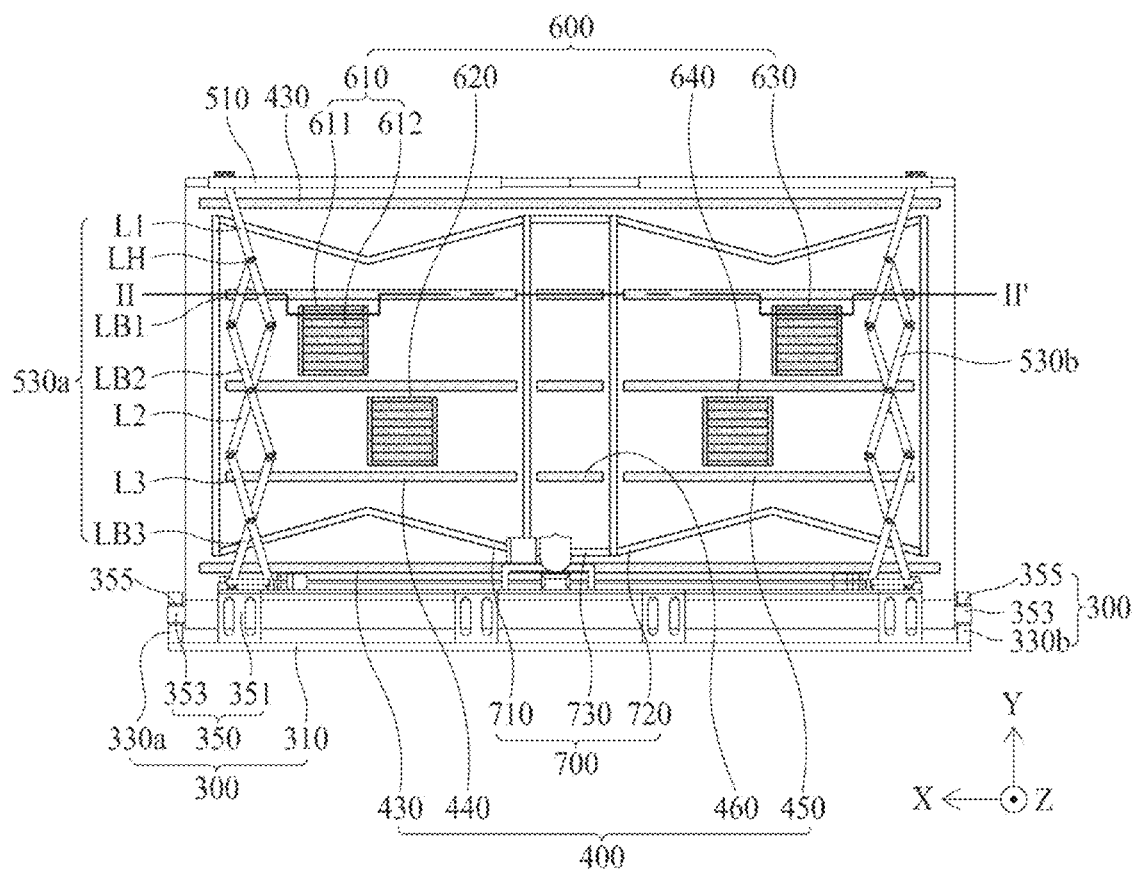
FIG. 11 is a rear view of a display apparatus according to another embodiment of the present disclosure.
Figure 12:
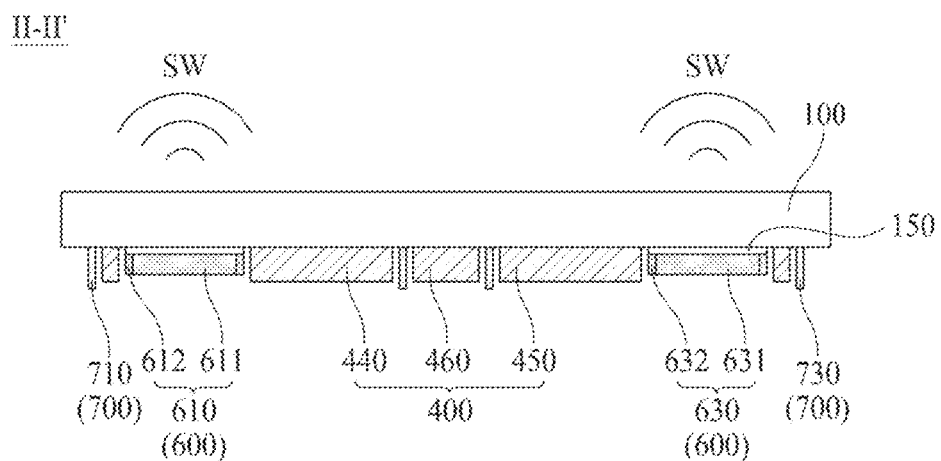
FIG. 12 is a cross-sectional view taken along line II-IF of FIG. 11.

FIG. 11 is a rear view of a display apparatus according to another embodiment of the present disclosure. FIG. 12 is a cross-sectional view taken along line II-IF of FIG. 11.

With reference to FIGS. 11 and 12, the display panel 100 may include first to third areas A1, A2, and A3. For example, the first area A1 of the display panel 100 may be a left area, the second area A2 may be a right area, and the third area A3 may be a center area. The first and second areas A1 and A2 may be symmetrical to each other based on the center portion of the display panel 100 or the third area A3.

The bent portion 711 of the first partition 710 may be bent toward the center of the first vibration module 610, and may be bent toward the center of the second vibration module 620. Therefore, the bent portion that is bent toward the first vibration module 610 and the bent portion that is bent toward the second vibration module 620 may be asymmetrical to each other based on the first direction X. The bent portion 721 of the second partition 720 may be bent toward the center of the third vibration module 630, and may be bent toward the center of the fourth vibration module 640. Therefore, the bent portion that is bent toward the third vibration module 630 and the bent portion that is bent toward the fourth vibration module 640 may be asymmetrical to each other based on the first direction X. The third partition 730 may not include the bent portion, or the third partition 730 may include the bent portion.

For example, the plurality of rigid members 400 may be directly attached to the rear surface of the display panel 100. The plurality of rigid members 400 may include a plurality of third to sixth rigid members 430, 440, 450, and 460.

The plurality of third rigid members 430 may be outside the partition 700, may extend in the first direction X, and may be spaced apart from each other in the second direction Y. The plurality of third rigid members 430 may be at an upper portion or a lower portion of the partition 700 on the rear surface of the display panel 100, and may extend in the first direction X. For example, the plurality of third rigid members 430 may extend in a straight line from a left periphery of the display panel 100 to a right periphery outside the upper portion or the lower portion of the partition 700. Therefore, the plurality of third rigid members 430 may be directly attached to the rear surface of the display panel 100 to be spaced apart from the partition 700, thereby supporting the display panel 100, which may be unfolded or unrolled.

According to an embodiment, a width of each of the plurality of third rigid members 430 may be inversely proportional to a curvature of the display panel 100. Therefore, each of the plurality of third rigid members 430 may have a certain width set in accordance with the curvature of the display panel 100, and may be wound together with the display panel 100.

The plurality of third rigid members 430 may reduce resonance frequency of the display panel 100 by increasing a mass of the display panel 100, which may act as a vibration plate. Therefore, the plurality of third rigid members 430 may improve a sound pressure of a low-pitched reproduction range, and may extend a reproduction frequency band by reducing the lowest pitched sound range (or the lowest reproduction frequency), which may be reproduced or generated by the display panel 100. Therefore, the display apparatus 10 according to an embodiment of the present disclosure may stably support the display panel 100, even without a separate rear structure on the rear surface of the display panel 100, by including the plurality of third rigid members 430, and may improve flatness of the sound pressure by improving the sound pressure of the low-pitched reproduction band.

The plurality of fourth rigid members 440 may be on the first area A1 surrounded by the first partition 710, the plurality of fifth rigid members 450 may be on the second area A2 surrounded by the second partition 720, and the plurality of sixth rigid members 460 may be on the third area A3 surrounded by the third partition 730. The plurality of fourth to sixth rigid members 440, 450, and 460 may be on the same line of the first direction X, and may be spaced apart from one another by the partition 710 that partitions the first to third areas A1, A2, and A3. Hereinafter, a description will be given based on the plurality of fourth rigid members 440, and the plurality of fifth and sixth rigid members 450 and 460 will be described briefly or omitted.

The plurality of fourth rigid members 440 may be inside or on an inner portion the first partition 710, may extend in the first direction X, and may be spaced apart from each other in the second direction Y by the first and second vibration modules 610 and 620 being interposed therebetween. For example, the plurality of fourth rigid members 440 may extend from a left periphery of the first area A1 to a right periphery of the first area A1 so that the fourth rigid members 440 may not overlap or correspond to the first vibration module 610 or the second vibration module 620. The plurality of fourth rigid members 440 may be spaced from the plurality of sixth rigid members 460 by the partition 700 that partitions the first area A1 and the third area A3. Therefore, the plurality of fourth rigid members 440 may be directly attached to the rear surface of the display panel 100 so that the partition 700 may not overlap or correspond to the first and second vibration modules 610 and 620, thereby supporting the first area A1 of the display panel 100.

According to an embodiment, a width of each of the plurality of fourth rigid members 440 may be inversely proportional to the curvature of the display panel 100. Therefore, each of the plurality of fourth rigid members 440 may have a certain width set in accordance with the curvature of the display panel 100, and may be wound together with the display panel 100.

The plurality of fourth rigid members 440 may reduce resonance frequency of the display panel 100 by increasing a mass of the first area A1 of the display panel 100, which may act as a vibration plate. Therefore, the plurality of fourth rigid members 440 may improve a sound pressure of a low-pitched reproduction band, and may extend a reproduction frequency band by reducing the lowest pitched sound range (or the lowest reproduction frequency), which may be reproduced or generated by the display panel 100.

Therefore, the display apparatus 10 according to an embodiment of the present disclosure may stably support the display panel 100, even without a separate rear structure on the rear surface of the display panel 100, by including the plurality of fourth rigid members 440, and may improve flatness of the sound pressure by improving the sound pressure of the low-pitched reproduction band.

Figure 13:
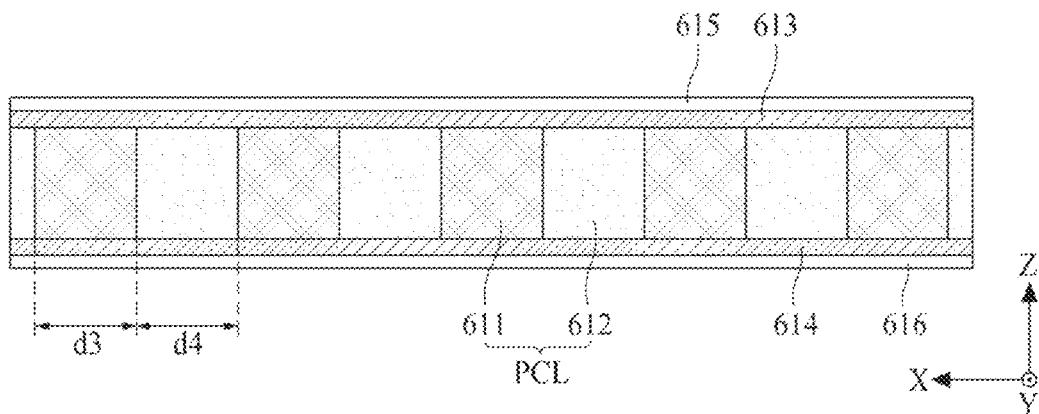
FIG. 13 is a cross-sectional view of a vibration module of a display apparatus according to an embodiment of the present disclosure.
Figure 14:
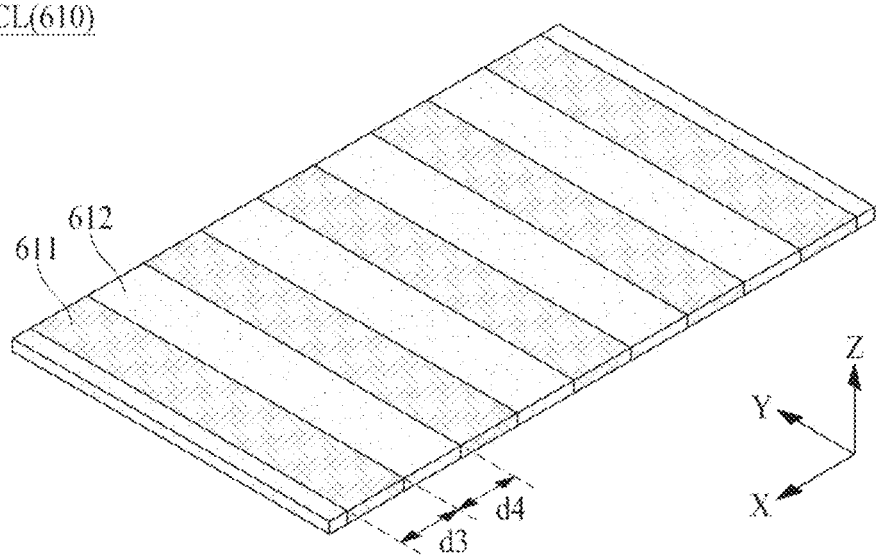
FIG. 14 illustrates a piezoelectric composite layer of the vibration module of FIG. 13.

FIG. 13 is a cross-sectional view of a vibration module of a display apparatus according to an embodiment of the present disclosure. FIG. 14 illustrates a piezoelectric composite layer of the vibration module of FIG. 13.

With reference to FIGS. 13 and 14, the first vibration module 610 may include a piezoelectric composite layer PCL, a first electrode layer 613, and a second electrode layer 614. The piezoelectric composite layer PCL may include a plurality of first portions 611 and a plurality of second portions 612. According to an embodiment, each of the plurality of first portions 611 may be a line pattern having a certain third length d3, and may be spaced apart from another first portion to have a certain fourth length d4 (or interval or distance) along a first direction X, and arranged in parallel with a second direction Y crossing the first direction X. The plurality of first portions 611 may have the same size, for example, the same width, area or volume, within a process error (or allowable error or tolerance) generated in a manufacturing process.

According to an embodiment, each of the plurality of first portions 611 may include an inorganic material or piezoelectric material that may be vibrated by a piezoelectric effect (or piezoelectric property) according to an electric field. For example, each of the plurality of first portions 611 may be referred to as, but is not limited to, an "electroactive" portion, an "inorganic material" portion, a "piezoelectric material" portion, or a "vibration" portion.

According to an embodiment, each of the plurality of first portions 611 may include an electroactive material. The electroactive material is characterized in that pressure or distortion acts on a crystalline structure by an external force. Thus, a potential difference occurs by dielectric polarization according to a relative position change of positive (+) ions and negative (−) ions, whereas vibration occurs by an electric field according to a voltage which is applied.

For example, the inorganic material portion in each of the plurality of first portions 611 may include, but is not limited to, one or more of: lead (Pb), zirconium (Zr), titanium (Ti), zinc (Zn), manganese (Mn), nickel (Ni), and niobium (Nb). As another example, the inorganic material portion in each of the plurality of first portions 611 may include, but is not limited to, a PZT (lead zirconate titanate) base material including Pb, Zr, and Ti, or a PZNN (lead zirconate nickel niobate) based material including Pb, Zn, Ni, Mn, and Nb. Also, the inorganic material portion may include, but is not limited to, at least one of calcium titanate ($CaTiO_3$), barium titanate ($BaTiO_3$), and strontium titanate ($SrTiO_3$), which do not include Pb.

Each of the plurality of second portions 612 may be between the plurality of first portions 611. Each of the plurality of first portions 611 and the plurality of second portions 612 may be on the same plane (or same layer) in parallel. Each of the plurality of second portions 612 may fill a gap between two of the first portions 611 adjacent to each other, and thus may be connected with or adhered to the first portions 611 adjacent thereto. For example, the plurality of second portions 612 may be a line pattern having a certain fourth length d4, and may be arranged in parallel with the first portion 611 interposed therebetween. Each of the plurality of second portions 612 may have the same size, for example, the same width, area or volume, within a process error (or allowable error or tolerance) generated in a manufacturing process. When the inorganic material portion (the first portion) and the organic material portion (the second portion) of the first vibration module 610 of the display apparatus 10 according to an embodiment of the present disclosure are arranged on the same layer, external impact of the display apparatus may be absorbed by the organic material portion, whereby a damage of the inorganic material portion and vibration performance deterioration (or sound performance deterioration) caused by the damage may be minimized or avoided.

The second portions 612 may be equal to or different from the first portions 611. A size of each of the first portions 611 and the second portions 612 may be set in accordance with desired features, such as vibration property and/or flexibility of the first vibration module 610.

The organic material portion in each of the plurality of second portions 612 may include an organic material or an organic polymer having a more flexible property, as compared with the inorganic material portion, which may be the first portion 611. For example, each of the plurality of second portions 612 may include one or more of: an organic material, an organic polymer, an organic piezoelectric material, and an organic non-piezoelectric material. For example, each of the plurality of second portions 612 may be referred to as, but is not limited to, an "adhesive" portion, an "elastic" portion, a "bending" portion, a "damping" portion, or a "flexible" portion. For example, the plurality of second portions 612 may include, but is not limited to, at least one of: PVDF (polyvinylidene fluoride), beta-PVDF (β-Polyvinylidene fluoride), PVDF-TrFE (Polyvinylidene-trifluoroethylene), and PVDF-TrFE-CFE (Polyvinylidene-trifluoroethylene-chloro fluoro ethylene). The organic material portions may be between the respective inorganic material portions, may absorb impact applied to the inorganic material portion (or the first portion), and may improve durability of the first vibration module 610 by releasing stress concentrated on the inorganic material portion. Also, flexibility may be provided to the first vibration module 610.

As the first portions 611, including the inorganic material and having a piezoelectric property, and the second portions 612, including the organic material and having flexibility, may alternately and/or repeatedly be connected with each other, the piezoelectric composite layer PCL may have a thin film shape, and may have a size corresponding to the display panel 100 of the display apparatus or a size that can implement vibration property or sound characteristic adjusted by the display panel 100.

According to an embodiment, the first vibration module 610 according to an embodiment of the present disclosure may be implemented in a pattern shape of the organic material portion and the inorganic material portion, whereby the area (or size) of the first vibration module 610 may be enlarged to any desired amount. For this reason, panel coverage of the first vibration module 610 for the display panel 100 may be increased, whereby sound pressure characteristic according to vibration of the display panel 100 may be improved. Because the first vibration module 610 may have a slim size, increase of a driving voltage may be reduced or avoided. Also, because the first vibration module 610 according to an embodiment of the present disclosure may be implemented in a thin film shape including the inorganic material portion and the organic material portion, the first vibration module 610 may be provided in the display apparatus in a single body without interference with the other parts and/or mechanism constituting the display apparatus.

The piezoelectric composite layer PCL may be polarized by a certain voltage applied to the first electrode layer 613 and the second electrode layer 614 in an atmosphere of a certain temperature. The first electrode layer 613 may be on a first surface (or front surface) of the piezoelectric composite layer PCL, and may be electrically connected to the first surface of each of the plurality of first portions 611. According to an embodiment, the first electrode layer 613 may include a transparent conductive material, a semi-transparent conductive material, or an opaque conductive material. For example, the transparent or semi-transparent conductive material may include, but is not limited to, indium tin oxide (ITO) or indium zinc oxide (IZO). The opaque conductive material may include, but is not limited to, one or more of aluminum (Al), copper (Cu), gold (Au), silver (Ag), molybdenum (Mo), magnesium (Mg), and/or any alloy of the above.

The second electrode layer 614 may be on a lower portion of a second surface (or rear surface) opposite to the first surface of the piezoelectric composite layer PCL, and may be electrically connected to the second surface of each of the plurality of first portions 611. According to an embodiment, the second electrode layer 614 may include a transparent conductive material, a semi-transparent conductive material, or an opaque conductive material. For example, the second electrode layer 614 may include, but is not limited to, the same material as that of the first electrode layer 613.

The first vibration module 610 may include a first protective film 615 and a second protective film 616. The first protective film 615 may be on the first electrode layer 613, and may protect the first surface of the piezoelectric composite layer PCL or the first electrode layer 613. For example, the first protective film 615 may be, but is not limited to, a polyimide (PI) film or polyethyleneterephthalate (PET) film.

The second protective film 616 may be on the second electrode layer 614, and may protect the second surface of the piezoelectric composite layer PCL or the second electrode layer 614. For example, the second protective film 616 may be, but is not limited to, a polyimide (PI) film or polyethyleneterephthalate (PET) film.

Figure 15:
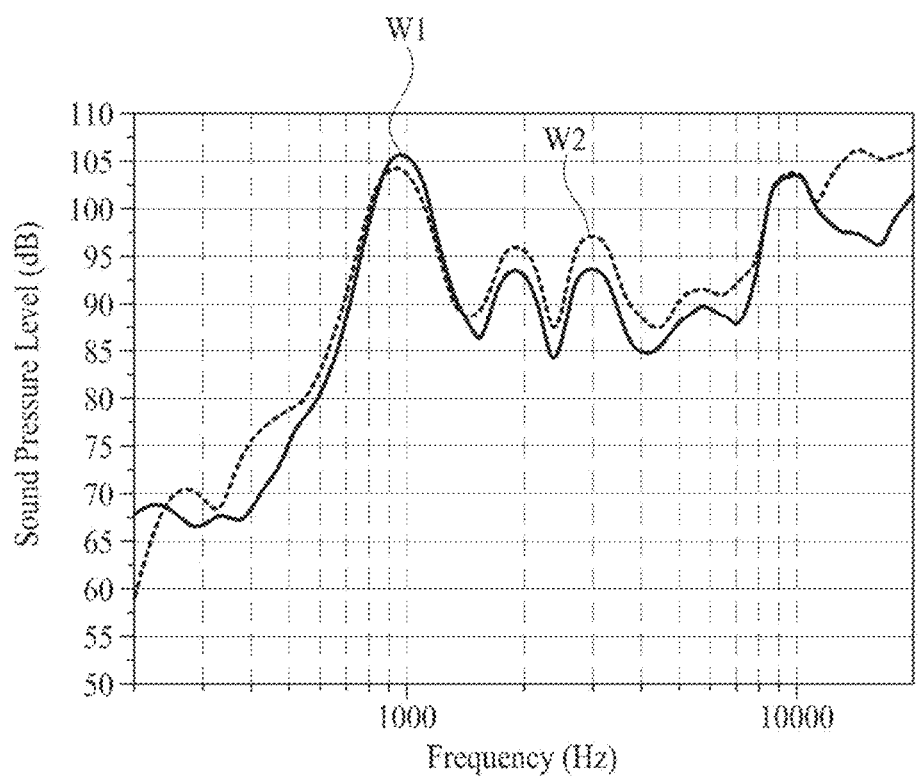
FIG. 15 is a graph of experimental results of a sound pressure level according to a width of a plurality of first portions in a display apparatus according to an embodiment of the present disclosure.

FIG. 15 is a graph of experimental results of a sound pressure level according to a width of a plurality of first portions in a display apparatus according to an embodiment of the present disclosure.

The plurality of first portions 611 may have a first width W1 or a second width W2. For example, the first width W1 may be 350 and the second width W2 may be 1500 With reference to FIG. 15, the vibration module including the plurality of first portions 611 having the first width W1 may have a sound pressure level averaging 88 dB at a frequency bandwidth of 200 to 1 kHz, and may have a sound pressure averaging 93.3 dB at a frequency bandwidth of 1 kHz to 20 kHz. The vibration module including the plurality of first portions 611 having the second width W2 may have a sound pressure level averaging 90.5 dB at a frequency bandwidth of 200 to 1 kHz, and may have a sound pressure level averaging 96.1 dB at a frequency bandwidth of 1 kHz to 20 kHz.

According to an embodiment, the width (or length of the second direction Y) of each of the plurality of first portions 611 may be proportional to the width (or length of the second direction Y) of each of the plurality of rigid members 400. For example, as the width of each of the plurality of rigid members 400 increases, the width of each of the plurality of first portions 611 may increase. The width of each of the plurality of first portions 611 having a piezoelectric property may be increased or maximized within a range that may not exceed the width of each of the plurality of rigid members 400. For example, each of the plurality of first portions 611 may have a certain width set in accordance with the width of each of the plurality of rigid members 400, and may be wound together with the display panel 100, and a sound pressure of a sound output from the display panel 100 may be improved. Therefore, the display apparatus according to an embodiment of the present disclosure may wind or unwind the plurality of first portions 611 together with the display panel 100 by increasing or maximizing the width of each of the plurality of first portions 611 within a range that may not exceed the width of each of the plurality of rigid members 400, and may improve the sound pressure output from the display panel 100.

The display apparatus according to the embodiment of the present disclosure may be applied to a wearable apparatus, a foldable apparatus, a rollable apparatus, a bendable apparatus, a flexible apparatus, a curved apparatus, a desktop personal computer (PC), a laptop PC, a netbook computer, a workstation, a navigator, a vehicle navigator, a vehicle display apparatus, a vehicle apparatus, a television, a wallpaper apparatus, a signage apparatus, a game apparatus, a notebook computer, a monitor, a camera, a camcorder, and a home appliance. The vibration modules of the present disclosure may be applied to an organic light-emitting lamp device or an inorganic light-emitting lamp device. If the vibration modules are applied to the lamp device, the vibration modules may serve as lamps and speakers. Embodiments are not limited to these examples.

A display apparatus according to an embodiment of the present disclosure will be described as follows.

According to an embodiment of the present disclosure, a display apparatus may include: a display panel configured to be rolled or unrolled, at least one vibration module on a rear surface of the display panel, the at least one vibration module being configured to: be rolled or unrolled with the display panel, and vibrate the display panel, and a partition on the rear surface of the display panel, the partition being spaced apart from and surrounding the at least one vibration module. The at least one vibration module may include: a plurality of first portions having a piezoelectric property, and a plurality of second portions between the plurality of first portions, the plurality of second portions having flexibility.

For example, in the display apparatus according to an embodiment of the present disclosure, the plurality of first portions may be extended in a first direction and spaced apart from each other in a second direction vertical to the first direction. For example, the display apparatus according to an embodiment of the present disclosure may further include a plurality of rigid members on the partition, the plurality of rigid members extending in a first direction and being spaced apart from each other in a second direction vertical to the first direction.

For example, in the display apparatus according to an embodiment of the present disclosure, the plurality of first portions may correspond to the plurality of rigid members, and at least some of the plurality of second portions may not correspond to the plurality of rigid members. For example, in the display apparatus according to an embodiment of the present disclosure, a width of each of the plurality of rigid members or a length of the second direction of each of the plurality of rigid members: may be at least a width of each of the plurality of first portions, or may be at least a length of the second direction of each of the plurality of rigid members.

For example, in the display apparatus according to an embodiment of the present disclosure, the plurality of rigid members may be spaced apart from at least one vibration module by the partition. For example, in the display apparatus according to an embodiment of the present disclosure, a width of the plurality of rigid members: may be proportional to each of the plurality of first portions, and may be inversely proportional to a curvature of the rolled display panel.

For example, in the display apparatus according to an embodiment of the present disclosure, the plurality of rigid members may be arranged on a rear surface of the partition at constant distances. For example, in the display apparatus according to an embodiment of the present disclosure, the plurality of rigid members may include: a plurality of first rigid members that may correspond to the plurality of first portions, and may be arranged at a first distance, and a plurality of second rigid members that may not correspond to the plurality of first portions, and may be arranged at a second distance greater than the first distance.

For example, the display apparatus according to an embodiment of the present disclosure may further include a plurality of rigid members directly attached to the rear surface of the display panel. For example, in the display apparatus according to an embodiment of the present disclosure, the plurality of rigid members further may include third rigid members outside the partition, the third rigid members extending in the first direction and being spaced apart from each other in the second direction.

For example, in the display apparatus according to an embodiment of the present disclosure, the plurality of rigid members further may include fourth rigid members inside the partition, the fourth rigid members extending in the first direction and being spaced apart from each other in the second direction by at least one of vibration module being interposed therebetween. For example, in the display apparatus according to an embodiment of the present disclosure, a width of each of the plurality of rigid members may be inversely proportional to the curvature of the display panel.

For example, in the display apparatus according to an embodiment of the present disclosure, the partition may include a material having flexibility to be rolled together with the display panel. For example, the display apparatus according to an embodiment of the present disclosure may further include a housing module including a roller configured to allow the display panel to be rolled-up therein, and a rolling module including a structure connected to the display panel, the rolling module being configured to unroll the display panel in accordance with unfolding of the structure by rotation of the roller.

For example, in the display apparatus according to an embodiment of the present disclosure, the roller may include: a roller unit, on which the display panel may be wound in a rolled-up state, and a shaft rotatably supporting the roller unit. For example, in the display apparatus according to an embodiment of the present disclosure, when in a folded state, the structure may be accommodated in the housing module, and when in an unfolded state, the structure may extend from the housing module.

For example, in the display apparatus according to an embodiment of the present disclosure, the plurality of first portions and the plurality of second portions may be arranged on a same layer in parallel. For example, in the display apparatus according to an embodiment of the present disclosure, the at least one vibration module may be adhered to the rear surface of the display panel by an adhesive member, and the adhesive member may include a hollow portion between the display panel and the at least one vibration module.

According to an embodiment of the present disclosure, a display apparatus may include: a display panel including a first area and a second area, the display panel being configured to display an image, a housing module including a roller configured to allow the display panel to be rolled-up therein, a rolling module including a structure connected to the display panel, the rolling module being configured to unroll the display panel in accordance with unfolding of the structure by rotation of the roller, a plurality of vibration modules on a rear surface of the display panel, the plurality of vibration modules being configured to: be rolled or unrolled with the display panel, and vibrate the first area and the second area of the display panel in an unrolled state, and a partition on the rear surface of the display panel, the partition being spaced apart from and surrounding the plurality of vibration modules.

For example, in the display apparatus according to an embodiment of the present disclosure, each of the plurality of vibration modules may include: a plurality of first portions having a piezoelectric property, and a plurality of second portions between the plurality of first portions, the plurality of second portions having flexibility. For example, the display apparatus according to an embodiment of the present disclosure may further include a plurality of rigid members on the partition, the plurality of rigid members extending in a first direction and being spaced apart from each other in a second direction vertical to the first direction.

For example, in the display apparatus according to an embodiment of the present disclosure, the plurality of rigid members may correspond to the plurality of first portions, and the plurality of rigid members may be arranged on a rear surface of the partition at constant intervals. For example, in the display apparatus according to an embodiment of the present disclosure, the plurality of rigid members may include: a plurality of first rigid members that may correspond to the plurality of first portions, and may be arranged at a first distance, and a plurality of second rigid members that may not correspond to the plurality of first portions, and may be arranged at a second distance greater than the first distance.

For example, the display apparatus according to an embodiment of the present disclosure may further include a plurality of rigid members directly attached to the rear surface of the display panel. For example, in the display apparatus according to an embodiment of the present disclosure, the plurality of rigid members further may include third rigid members outside the partition, the third rigid members extending in the first direction and being spaced apart from each other in a second direction vertical to the first direction. For example, in the display apparatus according to an embodiment of the present disclosure, the plurality of rigid members further may include fourth rigid members inside the partition, the fourth rigid members extending in the first direction and being spaced apart from each other in the second direction by the plurality of vibration modules being interposed therebetween.

For example, in the display apparatus according to an embodiment of the present disclosure, the structure may include a first structure and a second structure arranged in parallel, the plurality of vibration module may include at least four vibration modules, a first vibration module and a second vibration module in the first area may be rotatably connected to the first structure, and a third vibration module and a fourth vibration module in the second area may be rotatably connected to the second structure. For example, in the display apparatus according to an embodiment of the present disclosure, the first vibration module and the second vibration module may be arranged in the first area along a diagonal line of a first direction and a second direction vertical to the first direction, and the third vibration module and the fourth vibration module may be arranged in the second area along a diagonal line of the first direction and the second direction. For example, in the display apparatus according to an embodiment of the present disclosure, the rolling module may include: a supporting frame connected to an end portion of the display panel, the supporting frame being configured to support the display panel, and a driving module accommodated in the housing module, the structure may be connected between the supporting frame and the driving module, and the structure may be configured to be folded or unfolded based on driving of the driving module.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. An apparatus, comprising:
   a vibration plate configured to be rolled or unrolled; and
   at least one vibration module configured to vibrate the vibration plate, the at least one vibration module comprising:
   a plurality of first portions having a piezoelectric property; and
   a plurality of second portions configured to fill a gap between a lateral surface of each of the plurality of first portions along a first direction parallel to a rear surface of the vibration plate, the plurality of second portions including an organic material having flexibility,
   wherein the at least one vibration module has flexibility by the plurality of second portions, and
   wherein the at least one vibration module further configured to be rolled or unrolled together with the vibration plate.

2. The apparatus of claim 1, wherein the plurality of first portions and the plurality of second portions are configured to vibrate the vibration plate.

3. The apparatus of claim 1, further comprising:
   a partition on a rear surface of the vibration plate, the partition surrounding the at least one vibration module; and
   a plurality of rigid members on the partition, the plurality of rigid members extending in the first direction, the plurality of rigid members being spaced apart from each other in a second direction vertical to the first direction.

4. The apparatus of claim 3, wherein:
   the plurality of first portions correspond to the plurality of rigid members; and
   at least some of the plurality of second portions do not correspond to the plurality of rigid members.

5. The apparatus of claim 3, wherein a width of each of the plurality of rigid members or a length of the second direction of each of the plurality of rigid members:
   is at least a width of each of the plurality of first portions; or
   is at least a length of the second direction of each of the plurality of first portions.

6. The apparatus of claim 3, wherein the plurality of rigid members are spaced apart from the at least one vibration module by the partition.

7. The apparatus of claim 3, wherein a width of the plurality of rigid members:
   is proportional to each of the plurality of first portions; and
   is inversely proportional to a curvature of the rolled vibration plate.

8. The apparatus of claim 3, wherein the plurality of rigid members are arranged on a rear surface of the partition at constant distances.

9. The apparatus of claim 3, wherein the plurality of rigid members comprises:
   a plurality of first rigid members that correspond to the plurality of first portions, the plurality of first rigid members being arranged at a first distance; and
   a plurality of second rigid members that do not correspond to the plurality of first portions, the plurality of second rigid members being arranged at a second distance greater than the first distance.

10. The apparatus of claim 3, wherein the partition surrounds the at least one vibration module on at least two sides or all sides.

11. The apparatus of claim 3, wherein the partition comprises a material having flexibility and configured to be rolled together with the vibration plate.

12. The apparatus of claim 1, further comprising a plurality of rigid members directly attached to the rear surface of the vibration plate.

13. The apparatus of claim 12, further comprising:
   a partition on the rear surface of the vibration plate, the partition surrounding the at least one vibration module,
   wherein the plurality of rigid members further comprises third rigid members outside the partition, the third rigid members extending in the first direction, the third rigid members being spaced apart from each other in a second direction vertical to the first direction.

14. The apparatus of claim 12, further comprising:
   a partition on the rear surface of the vibration plate, the partition surrounding the at least one vibration module,
   wherein the plurality of rigid members further comprises fourth rigid members inside the partition, the fourth rigid members extending in the first direction, the fourth rigid members being spaced apart from each other in a second direction vertical to the first direction by the at least one vibration module interposed therebetween.

15. The apparatus of claim 12, wherein a width of each of the plurality of rigid members is inversely proportional to the curvature of the vibration plate.

16. The apparatus of claim 1, further comprising:
a housing module comprising a roller configured to allow the vibration plate to be rolled-up therein; and
a rolling module comprising a structure connected to the vibration plate, the rolling module being configured to unroll the vibration plate in accordance with unfolding of the structure by rotation of the roller.

17. The apparatus of claim 16, wherein the roller comprises:
a roller part, on which the vibration plate is wound in a rolled-up state; and
a shaft rotatably supporting the roller part.

18. The apparatus of claim 1, wherein:
the vibration plate is a display panel including a display area configured to display an image; and
the at least one vibration module is configured to vibrate the display area of the display panel.

19. The apparatus of claim 1, wherein the plurality of first portions and the plurality of second portions are disposed in parallel along the first direction.

20. An apparatus, comprising: a vibration plate configured to be rolled or unrolled; and at least one vibration module configured to: vibrate the vibration plate; and to be wound or unwound together with the vibration plate, wherein the at least one vibration module comprises: a plurality of vibration portions, and a plurality of flexible portions configured to fill a gap between a lateral surface of each of the plurality of vibration portions along a first direction parallel to a rear surface of the vibration plate, the plurality of flexible portions including an organic material, and wherein the at least one vibration module has a single layered structure in which the plurality of vibration portions and the plurality of flexible portions are arranged on a same layer in parallel.

21. The apparatus of claim 20, wherein: the plurality of flexible portions are configured to fill a gap between two vibration portions adjacent to each other of the plurality of vibration portions; or the plurality of flexible portions are configured to connect between a lateral surface of each of two vibration portions adjacent to each other of the plurality of vibration portions; or each of the plurality of vibration portions does not overlap with each of the plurality of flexible portions.

22. The apparatus of claim 20, wherein the at least one vibration module further comprises: a first electrode layer on a first surface of each of the plurality of vibration portions and the plurality of flexible portions, the first electrode layer being configured to be electrically connected to the first surface of each of the plurality of vibration portions; and a second electrode layer on a second surface opposite to the first surface of each of the plurality of vibration portions and the plurality of flexible portions, the second electrode layer being configured to be electrically connected to the second surface of each of the plurality of vibration portions.

23. The apparatus of claim 20, wherein: the at least one vibration module is adhered to a rear surface of the vibration plate by an adhesive member; and the adhesive member comprises a hollow portion between the vibration plate and the at least one vibration module.

24. The apparatus of claim 20, wherein: the vibration plate is a display panel including a display area configured to display an image; and the at least one vibration module is configured to vibrate the display area of the display panel.

25. The apparatus of claim 20, wherein the plurality of vibration portions and the plurality of flexible portions are disposed in parallel along the first direction.

26. An apparatus, comprising: a vibration plate comprising a first area and a second area; a housing module comprising a roller configured to allow the vibration plate to be rolled-up therein; a rolling module comprising a structure connected to the vibration plate, the rolling module being configured to unroll the vibration plate in accordance with unfolding of the structure by rotation of the roller; and a plurality of vibration modules on a rear surface of the vibration plate, the plurality of vibration modules being configured to: be rolled or unrolled with the vibration plate; and vibrate the first area and the second area of the vibration plate in an unrolled state to generate sound, wherein each of the plurality of vibration modules comprises: a plurality of first portions having a piezoelectric property, and a plurality of second portions configured to connect between a lateral side surface of each of two first portions adjacent to each other of the plurality of first portions along a first direction parallel to a rear surface of the vibration plate, the plurality of second portions including an organic material, wherein the plurality of first portions and the plurality of second portions are disposed in parallel along the first direction, and wherein the plurality of first portions and the plurality of second portions are configured to vibrate the vibration plate.

27. The apparatus of claim 26, wherein the plurality of second portions have flexibility.

28. The apparatus of claim 26, further comprising: a partition on the rear surface of the vibration plate, the partition surrounding the plurality of vibration modules; and a plurality of rigid members on the partition, the plurality of rigid members extending in the first direction and being spaced apart from each other in a second direction vertical to the first direction.

29. The apparatus of claim 28, wherein: the plurality of rigid members correspond to the plurality of first portions; and the plurality of rigid members are arranged on a rear surface of the partition at constant intervals.

30. The apparatus of claim 28, wherein the plurality of rigid members comprises: a plurality of first rigid members that correspond to the plurality of first portions, the plurality of first rigid members being arranged at a first distance; and a plurality of second rigid members that do not correspond to the plurality of first portions, the plurality of second rigid members being arranged at a second distance greater than the first distance.

31. The apparatus of claim 28, wherein the partition surrounds the plurality of vibration modules on at least two sides or all sides.

32. The apparatus of claim 28, wherein the partition comprises a material having flexibility to be rolled together with the vibration plate.

33. The apparatus of claim 26, further comprising: a partition on the rear surface of the vibration plate, the partition surrounding the plurality of vibration modules; and a plurality of rigid members directly attached to the rear surface of the vibration plate.

34. The apparatus of claim 33, wherein the plurality of rigid members further comprises third rigid members outside the partition, the third rigid members extending in the first direction, the third rigid members being spaced apart from each other in a second direction vertical to the first direction.

35. The apparatus of claim 33, wherein the plurality of rigid members further comprise fourth rigid members inside the partition, the fourth rigid members extending in the first direction, the fourth rigid members being spaced apart from each other in a second direction vertical to the first direction by the plurality of vibration modules interposed therebetween.

36. The apparatus of claim 33, wherein the partition comprises: a first partition surrounding the first area on all four sides; and a second partition surrounding the second area on all sides.

37. The apparatus of claim 26, wherein: the plurality of second portions are configured to fill a gap between two first portions adjacent to each other of the plurality of first portions; or each of the plurality of first portions does not overlap with each of the plurality of second portions.

38. The apparatus of claim 26, wherein: the structure comprises a first structure and a second structure arranged in parallel; the plurality of vibration module comprises at least four vibration modules; a first vibration module and a second vibration module in the first area are rotatably connected to the first structure; and a third vibration module and a fourth vibration module in the second area are rotatably connected to the second structure.

39. The apparatus of claim 38, wherein: the first vibration module and the second vibration module are arranged in the first area along a diagonal line of the first direction and a second direction vertical to the first direction; and the third vibration module and the fourth vibration module are arranged in the second area along a diagonal line of the first direction and the second direction.

40. The apparatus of claim 26, wherein the rolling module comprises: a supporting frame connected to an end portion of the vibration plate, the supporting frame being configured to support the vibration plate; and a driving module accommodated in the housing module, wherein the structure is connected between the supporting frame and the driving module, and wherein structure is configured to be folded or unfolded based on driving of the driving module.

41. The apparatus of claim 26, wherein: the vibration plate is a display panel including a display area having the first area and the second area, the display area of the display panel being configured to display an image; and the plurality of vibration modules are further configured to vibrate the first area and the second area of the display panel, respectively.

* * * * *